United States Patent
Prakash et al.

(10) Patent No.: US 8,259,702 B2
(45) Date of Patent: Sep. 4, 2012

(54) EFFICIENT OVER THE AIR ADDRESS METHODS AND APPARATUS

(75) Inventors: Rajat Prakash, San Diego, CA (US); Paul E. Bender, San Diego, CA (US); Gavin Horn, La Jolla, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 11/759,910

(22) Filed: Jun. 7, 2007

(65) Prior Publication Data

US 2007/0286152 A1 Dec. 13, 2007

Related U.S. Application Data

(60) Provisional application No. 60/812,011, filed on Jun. 7, 2006, provisional application No. 60/812,012, filed on Jun. 7, 2006.

(51) Int. Cl.
*H04L 12/28* (2006.01)

(52) U.S. Cl. ........ 370/351; 370/310; 370/331; 370/345; 370/349; 370/389; 370/392; 370/475; 370/477; 455/422.1; 455/435.1

(58) Field of Classification Search .......................... None
See application file for complete search history.

(56) References Cited

U.S. PATENT DOCUMENTS

| | | | |
|---|---|---|---|
| 6,038,233 A | 3/2000 | Hamamoto et al. | |
| 6,115,394 A | 9/2000 | Balachandran et al. | |
| 6,122,671 A * | 9/2000 | Farrar et al. | 709/238 |
| 6,480,527 B1 | 11/2002 | Kim et al. | |
| 6,487,602 B1 | 11/2002 | Thakker | |
| 6,625,145 B1 | 9/2003 | Winell | |
| 6,697,354 B1 | 2/2004 | Borella et al. | |

(Continued)

FOREIGN PATENT DOCUMENTS

CA 2646082 A1 12/2007

(Continued)

OTHER PUBLICATIONS

International Search Report—PCT/US07/070486, International Search Authority—European Patent Office—Jan. 23, 2008.

(Continued)

*Primary Examiner* — Faruk Hamza
*Assistant Examiner* — Aixa A Guadalupe
(74) *Attorney, Agent, or Firm* — Darren M. Simon

(57) ABSTRACT

Addressing methods and apparatus which use airlink resources in an efficient manner are described. In order to use airlink resources efficiently, a variety of address types are supported. The number of bits in the address may vary depending on the type. In order to support a variety of different address types, of different lengths, in one embodiment, an address used for communications over an airlink is constructed by including in the address an address type field used to communicate an address type indicator and, optionally, an address field used to communicate an address value. The address field is variable in length and may be null, requiring the communication of no bits in this field, for certain types of addresses. Four types of addresses which may be supported include: i) an Access Terminal assisted address, ii) a Network assisted address, 3) a Pilot PN based address; and 4) a reserved address.

19 Claims, 13 Drawing Sheets

U.S. PATENT DOCUMENTS

| | | |
|---|---|---|
| 6,717,956 B1 * | 4/2004 | Fan et al. .................. 370/477 |
| 6,738,366 B1 | 5/2004 | Etemad et al. |
| 6,822,957 B1 | 11/2004 | Schuster et al. |
| 7,016,328 B2 | 3/2006 | Chari et al. |
| 7,170,871 B2 * | 1/2007 | Eyuboglu et al. ............ 370/331 |
| 7,221,651 B2 | 5/2007 | Mizoguchi et al. |
| 7,385,957 B2 | 6/2008 | O'neill |
| 7,453,852 B2 | 11/2008 | Buddhikot et al. |
| 7,505,432 B2 | 3/2009 | Leung et al. |
| 7,609,701 B2 | 10/2009 | Yang et al. |
| 7,639,686 B2 | 12/2009 | Wetterwald et al. |
| 7,715,413 B2 | 5/2010 | Vaziri et al. |
| 7,944,947 B2 | 5/2011 | Nykanen et al. |
| 2002/0058480 A1 * | 5/2002 | Ikeda ........................ 455/67.1 |
| 2002/0191567 A1 | 12/2002 | Famolari et al. |
| 2003/0009561 A1 | 1/2003 | Sollee |
| 2003/0161319 A1 | 8/2003 | Okagawa et al. |
| 2004/0005894 A1 | 1/2004 | Trossen et al. |
| 2004/0097232 A1 | 5/2004 | Haverinen |
| 2004/0167988 A1 | 8/2004 | Rune et al. |
| 2004/0213274 A1 | 10/2004 | Fan et al. |
| 2004/0255331 A1 | 12/2004 | Inoue et al. |
| 2005/0010686 A1 | 1/2005 | Nishida et al. |
| 2005/0084079 A1 | 4/2005 | Lang |
| 2005/0141515 A1 * | 6/2005 | Mangin et al. ............. 370/395.5 |
| 2005/0190818 A1 | 9/2005 | Sunaga et al. |
| 2005/0259654 A1 | 11/2005 | Faulk |
| 2006/0029081 A1 | 2/2006 | Yan et al. |
| 2006/0098644 A1 | 5/2006 | Pullela et al. |
| 2006/0209759 A1 | 9/2006 | Vesterinen |
| 2006/0234636 A1 | 10/2006 | Miller et al. |
| 2006/0270437 A1 | 11/2006 | Ueda et al. |
| 2007/0047583 A1 | 3/2007 | Assa et al. |
| 2007/0189309 A1 | 8/2007 | Bosch et al. |
| 2008/0267186 A1 | 10/2008 | Boukis et al. |

FOREIGN PATENT DOCUMENTS

| | | |
|---|---|---|
| CA | 2648119 A1 | 12/2007 |
| CA | 2648122 A1 | 12/2007 |
| CA | 2651551 A1 | 12/2007 |
| CN | 1437809 A | 8/2003 |
| EP | 0594196 A1 | 4/1994 |
| EP | 1445919 | 8/2004 |
| EP | 2027703 | 2/2009 |
| GB | 2415855 A | 1/2006 |
| JP | 2001244937 A | 9/2001 |
| JP | 2002534911 T | 10/2002 |
| JP | 2002534922 A | 10/2002 |
| JP | 2003526277 T | 9/2003 |
| JP | 2009540690 | 11/2009 |
| JP | 2009540693 | 11/2009 |
| JP | 2009540697 | 11/2009 |
| RU | 2073913 C1 | 2/1997 |
| WO | WO9205556 | 4/1992 |
| WO | WO9307691 | 4/1993 |
| WO | WO9912364 A2 | 3/1999 |
| WO | WO9945678 A1 | 9/1999 |
| WO | WO0041376 | 7/2000 |
| WO | WO0167676 A2 | 9/2001 |
| WO | WO03041341 A1 | 5/2003 |
| WO | 03081860 | 10/2003 |
| WO | WO2005101731 | 10/2005 |
| WO | WO2007143717 | 12/2007 |
| WO | WO2007143731 | 12/2007 |

OTHER PUBLICATIONS

R. Hinden and S. Deering, RFC 4291, IP Version 6 Addressing Architecture, Feb. 2006, The Internet Society, pp. 13-15. (51 pages).

Written Opinion—PCT/US2007/070486, International Search Authority, European Patent Office, Jan. 23, 2008.

Taiwanese Search report—096120613—TIPO—Dec. 19, 2010.

Translation of Office Action in chinese application 200780015399.9 corresponding to U.S. Appl. No. 11/759,883, citing CN1437809A dated Jan. 6, 2011.

Translation of Office Action in Chinese application 200780020889.8 corresponding to U.S. Appl. No. 11/759,910, citing CN1437809 dated Mar. 14, 2011.

* cited by examiner

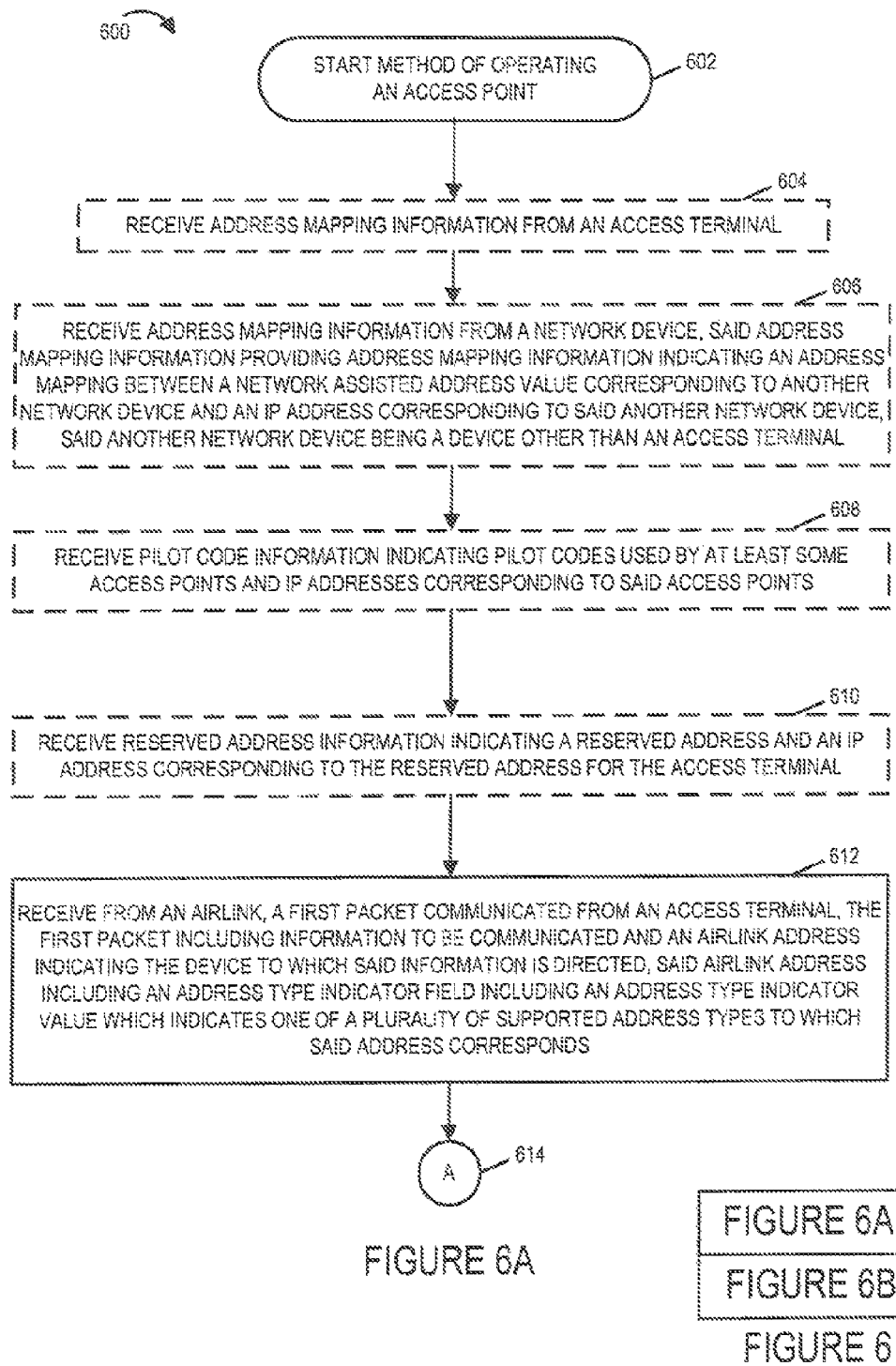

EFFICIENT OVER THE AIR ADDRESS METHODS AND APPARATUS

RELATED APPLICATIONS

The present application claims the benefit of U.S. Provisional Patent Application Ser. No. 60/812,011 filed on Jun. 7, 2006, titled "A METHOD AND APPARATUS FOR L2TP TUNNELING" and the benefit of U.S. Provisional Patent Application Ser. No. 60/812,012 filed on Jun. 7, 2006 titled "A METHOD AND APPARATUS FOR ADDRESSING MULTIPLE ACCESS POINTS" each of which is hereby expressly incorporated by reference.

FIELD

Various embodiments are directed to methods and apparatus for communications, and more particularly to methods and apparatus related which support use of different types of addresses.

BACKGROUND

Wireless communications systems often include a plurality of access points (APs) and/or other network elements in addition to access terminals, e.g., mobile or other end node devices. In many cases access terminals normally communicate with access points via wireless communications links while other elements in the network, e.g., APs, generally communicate via non-air links, e.g., fiber, cable or wire links. In the case of an airlink, bandwidth is a valuable constrained resource. Accordingly, it is desirable that communication over the airlink be performed in an efficient manner without excessive overhead.

Communications links between access points and/or other network devices are often less constrained from a bandwidth perspective than are air links between access terminals and access points. Accordingly, more overhead in terms of address length and/or other information may be acceptable over backhaul links than over an airlink.

While IP (Internet Protocol) addresses have been used successfully in networks for many years, they tend to include a fair number of bits. For communications over airlinks, it would be desirable if shorter addresses could be used over the airlink. However, it would be desirable that any changes to addresses used over the airlink not preclude the use of IP addresses over other links, e.g., backhaul links.

SUMMARY

Addressing methods and apparatus which use airlink resources in an efficient manner are described. In order to use airlink resources efficiently, a variety of address types are supported. The number of bits in the address may vary depending on the type.

In order to support a variety of different address types, of different lengths, in one embodiment an address used for communications over an airlink is constructed by including in the address an address type field used to communicate an address type indicator and, optionally, an address field used to communicate an address value. The address field is variable in length and may be null, requiring the communication of no bits in this field, for certain types of addresses.

A relatively short address type field is used in some embodiments. In one particular exemplary embodiment the address type field is two bits in length allowing for up to 4 different address types to be specified. In one such embodiment the four types of addresses which may be supported include, for example, i) an Access Terminal (AT) assisted address, ii) a Network assisted address, 3) a Pilot PN based address; and 4) a reserved address.

In the case of an AT assisted address type, the AT includes mapping information in one or more messages exchanged with an AP. Thus, the AT provides the mapping to be used between a short airlink address and a longer address used in the communications network, e.g., a full IP address.

In the case of a Network assisted address, address mapping information may be provided by a central entity in the communications network and/or by another device in the network, e.g., an Access Point (AP) to which a message may be addressed using a short address over the air and a long, e.g., full IP address for communications sent over non-air based communications links, e.g., back haul links.

For communications over the air link, between an AP and an AT a Pilot PN code based address is used as an AP identifier, e.g., address in some embodiments. The pilot PN code is an pilot identifier that is used to distinguish the pilot channel or channels transmitted by different access points or sectors. When the pilot channel uses a Pseudorandom Noise (PN) type of generation scheme, this identifier is typically called a PilotPN. In this application, the term "PN Code" refers to a generic pilot identifier and a PN Code address refers to an address based on a PN Code. Other examples of pilot generation include Gold sequence, Beacon based pilots etc. and in such cases a PN Code address refers to an address based on an identifier communicated by the type of pilots being used. In the case of PilotPN based addresses, also referred to herein as a PN Code address or pilot based address. The address value in an address including a Pilot PN address type indicator, may simply be a value equal to the Pilot PN of an AP, a shortened version of the Pilot PN value of the AP, e.g. some upper bits of the Pilot PN code, or some other value which can be derived from an APs PN code, e.g., using a known function. APs may include stored information regarding Pilot PN address values for APs in a network and their individual full IP address allowing mapping between PN code based addresses used over the air to IP addresses used for other network connections.

In the case of addresses of a reserved type, one or more different reserve address values may be used with their interpretation being fixed but possibly dependent on the AT sending or receiving a packet over the airlink including the reserved address. Examples of reserved address types include an IAP (Internet Attachment Point) address and a Session Controller Address. In some embodiments each AP in a set which services an AT, sometimes called an "active set" knows the IP address of the IAP corresponding to the particular AT which it serves. This information is used in mapping between an IAP address received over the airlink and the full IP address corresponding to the IAP associated with a particular AT to/from which packets may be communicated over an airlink. A session controller address is an example of another type of reserved address. The session control for a communications session involving an AT is known to the AP with which an AT interacts. Accordingly, by using the reserved address corresponding to the session controller, an AT can communicate with the session controller without having to send the full address of the session controller over the airlink each time a communication is to be sent or received from the session controller.

An exemplary method of operating an access point, in accordance with some comprises: receiving from an airlink, a first packet communicated from an access terminal, the first packet including information to be communicated and an airlink address indicating the device to which said information is directed, said airlink address including an address type indicator field including an address type indicator value which indicates one of a plurality of supported address types to which said address corresponds; and determining, as a function of the type of address indicated by the address type indicator value included in the received airlink address, an IP address corresponding to the device to which said information is to be communicated. Another exemplary method of operating an access point, in accordance with some embodiments, comprises: receiving from a network connection, a first packet communicated from a device, the first packet including: i) information to be communicated to an access terminal and ii) an IP address corresponding to the device which is the source of said information; and generating a packet including said information and an airlink address corresponding to said device, said airlink address being one of a plurality of supported airlink address types, said airlink address including an address type indicator value and an address value, said address type indicator value indicating the type of airlink address being used, said address value corresponding to said device. An exemplary access point, in accordance with various embodiments, includes: a network interface including a receiver for receiving from a network connection, a first packet communicated from a device, the first packet including: i) information to be communicated to an access terminal and ii) an IP address corresponding to the device which is the source of said information; and a packet generation module for generating a second packet including said information and an airlink address corresponding to said device, said airlink address being one of a plurality of supported airlink address types, said airlink address including an address type indicator value and an address value, said address type indicator value indicating the type of airlink address being used, said address value corresponding to said device.

An exemplary method of operating an access terminal, in accordance with some embodiments, comprises: receiving from an airlink a packet, the packet including i) information to be communicated to said access terminal and ii) an airlink address indicating a network device which is the source of said information, said airlink address including an address type indicator field including an address type indicator value which indicates one of a plurality of supported address types to which said address corresponds; and determining from stored address information and said airlink address included in said received packet, the network device which is the source of information included in said received packet. Another exemplary method of operating an access terminal, in accordance with some embodiments, comprises: generating a packet including information to be communicated to a device and an airlink address corresponding to said device, said airlink address being one of a plurality of supported airlink address types, said airlink address including an address type indicator value and an address value, said address type indicator value indicating the type of airlink address being used, said address value corresponding to said device; and transmitting the generated packet to an access point over an airlink. An exemplary access terminal, in accordance with some embodiments, includes: an airlink address type selection module, for selecting a type of airlink address to be used to communicate information to a device, said address type being selected from a plurality of supported address types; and a packet generation module for generating a packet including: i) the information to be communicated and ii) an airlink address corresponding to the device to which said information is to be communicated, said airlink address including an address type indicator value and an address value, said address type indicator value indicating the type of airlink address being used, said address value corresponding to said device.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE DRAWINGS

FIG. 4 illustrates an exemplary network including a centralized AN architecture and an AT.

DETAILED DESCRIPTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Figure 1:
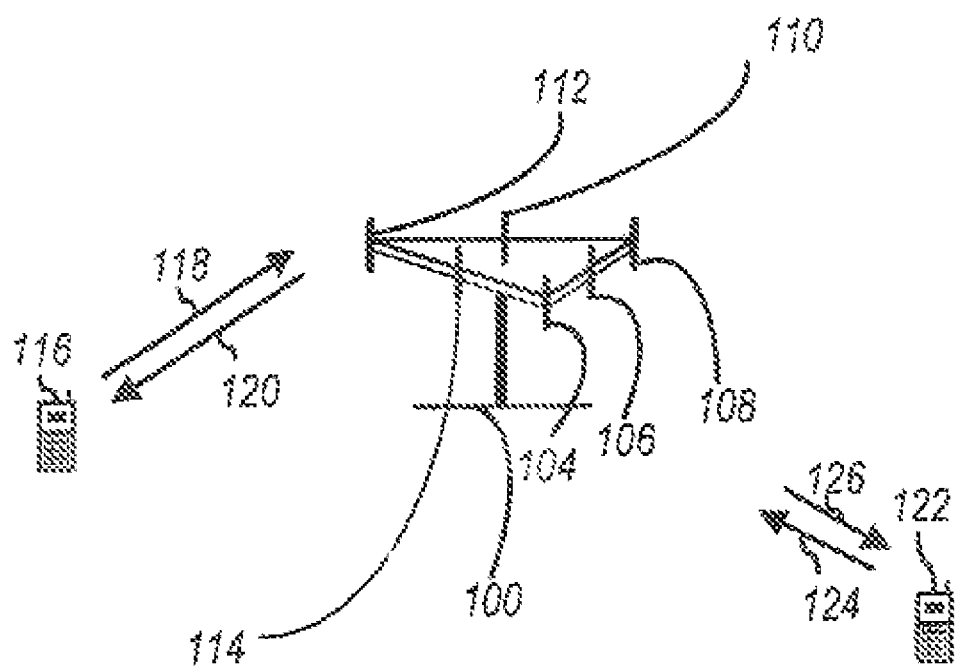
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access node, a Node B, a base station or some other terminology. An access terminal may also be called an access device, user equipment (UE), a wireless communication device, terminal, wireless terminal, mobile terminal, mobile node, end node or some other terminology.

Figure 2:
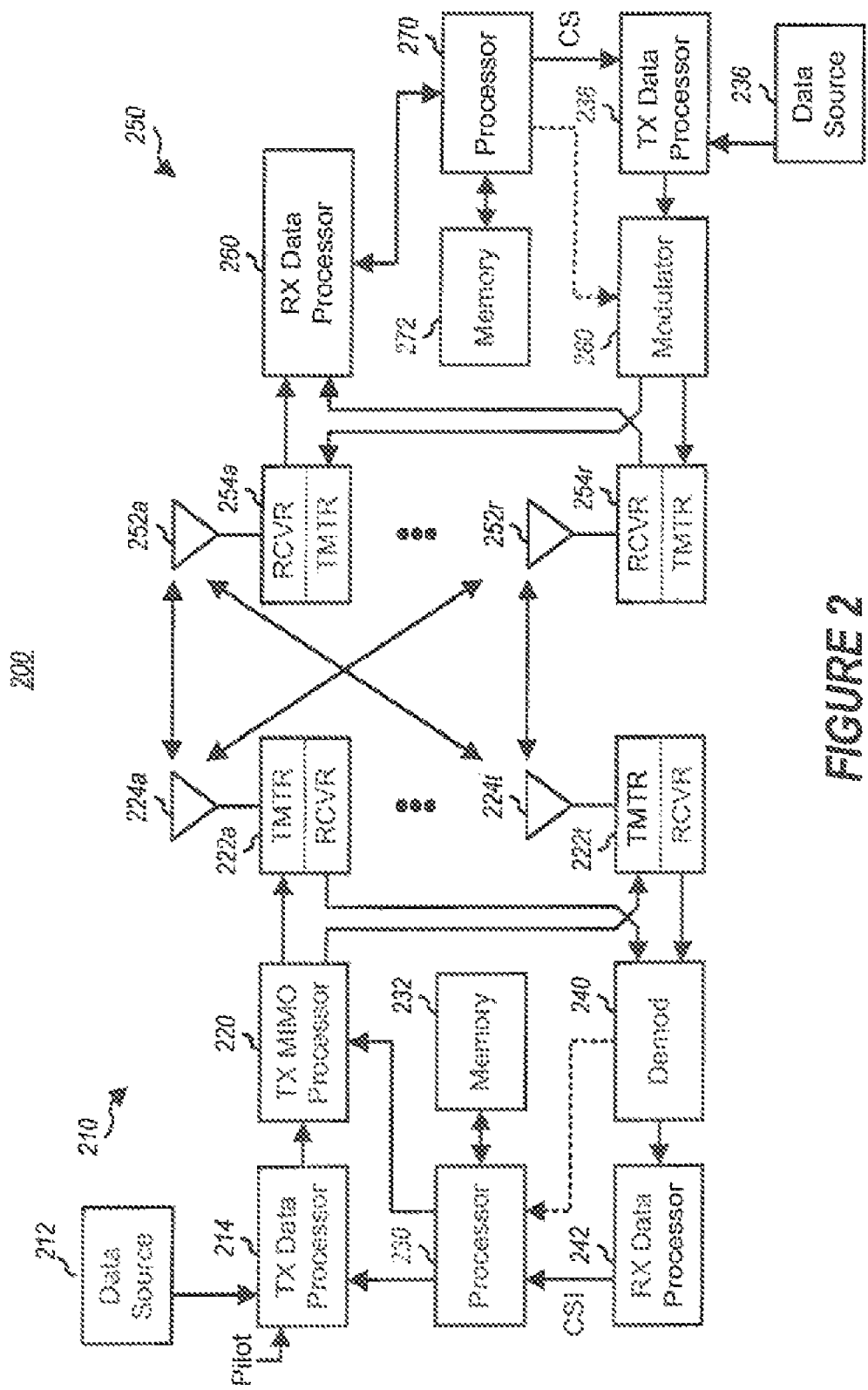
FIG. 2 is a block diagram of an exemplary communication system.

FIG. 2 is a block diagram of an embodiment of an exemplary access point 210 and an exemplary access terminal 250 in a MIMO system 200. At the access point 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for each of the data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter (222a, . . . , 222t) receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver (254a, . . . , 254r) conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers (254a, . . . , 254r) based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted, via antennas (252a, 252r), respectively, back to access point 210.

At access point 210, the modulated signals from access terminal 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights, then processes the extracted message.

Memory 232 includes routines and data/information. Processors 230, 220 and/or 242 execute the routines and uses the data/information in memory 232 to control the operation of the access point 210 and implement methods. Memory 272 includes routines and data/information. Processors 270, 260, and/or 238 execute the routines and uses the data/information in memory 272 to control the operation of the access terminal 250 and implement methods.

In an aspect, SimpleRAN is designed to significantly simplify the communications protocols between the backhaul access network elements in a wireless radio access network, while providing fast handoff to accommodate the demands of low latency applications, such as VOIP, in fast changing radio conditions.

In an aspect, the network comprises access terminals (AT) and an access network (AN).

The AN supports both a centralized and distributed deployment. The network architectures for the centralized and distributed deployments are shown in FIG. 3 and FIG. 4 respectively.

Figure 3:
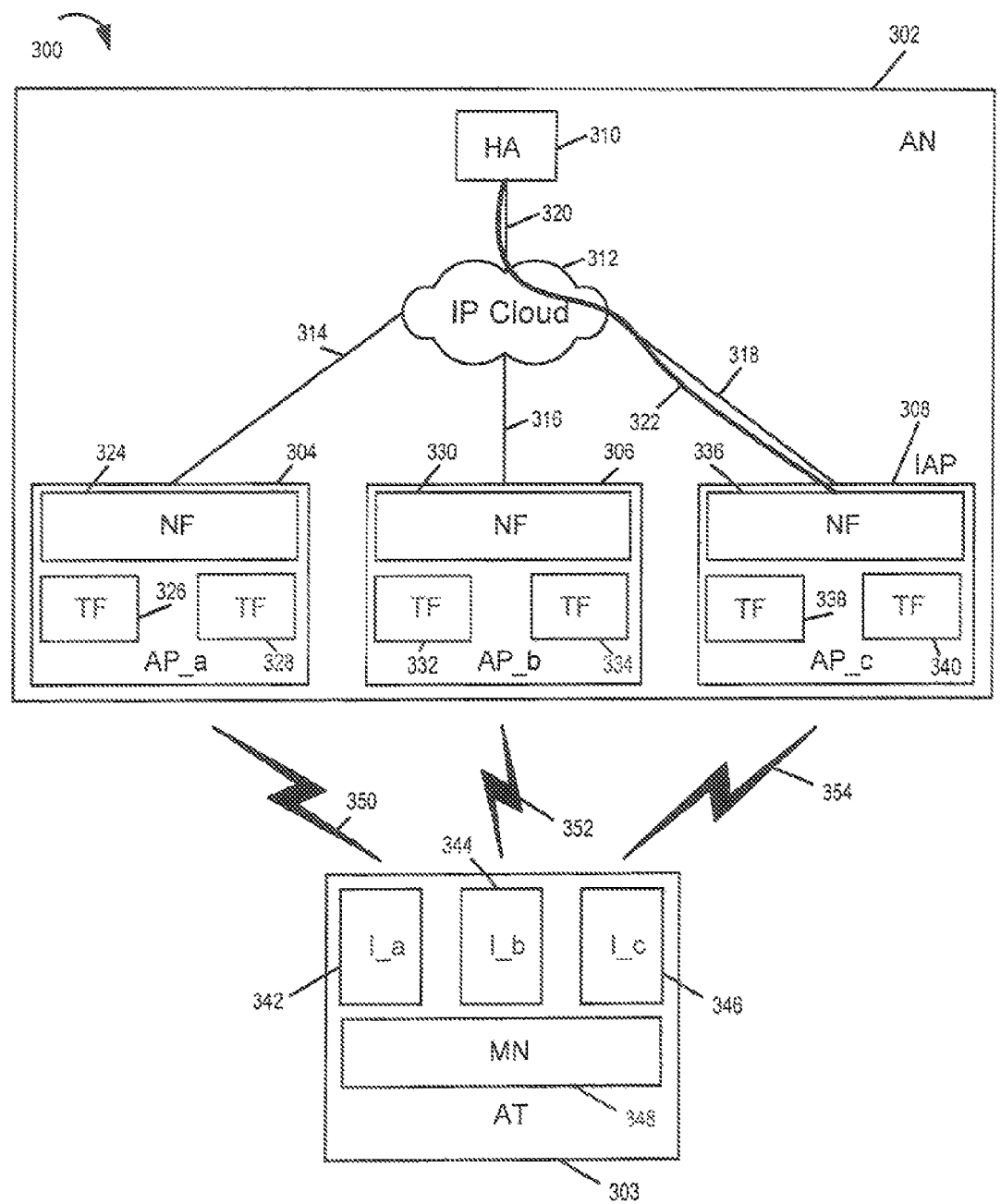
FIG. 3 illustrates an exemplary network including a distributed access network (AN) architecture and an access terminal (AT).
Figure 4:
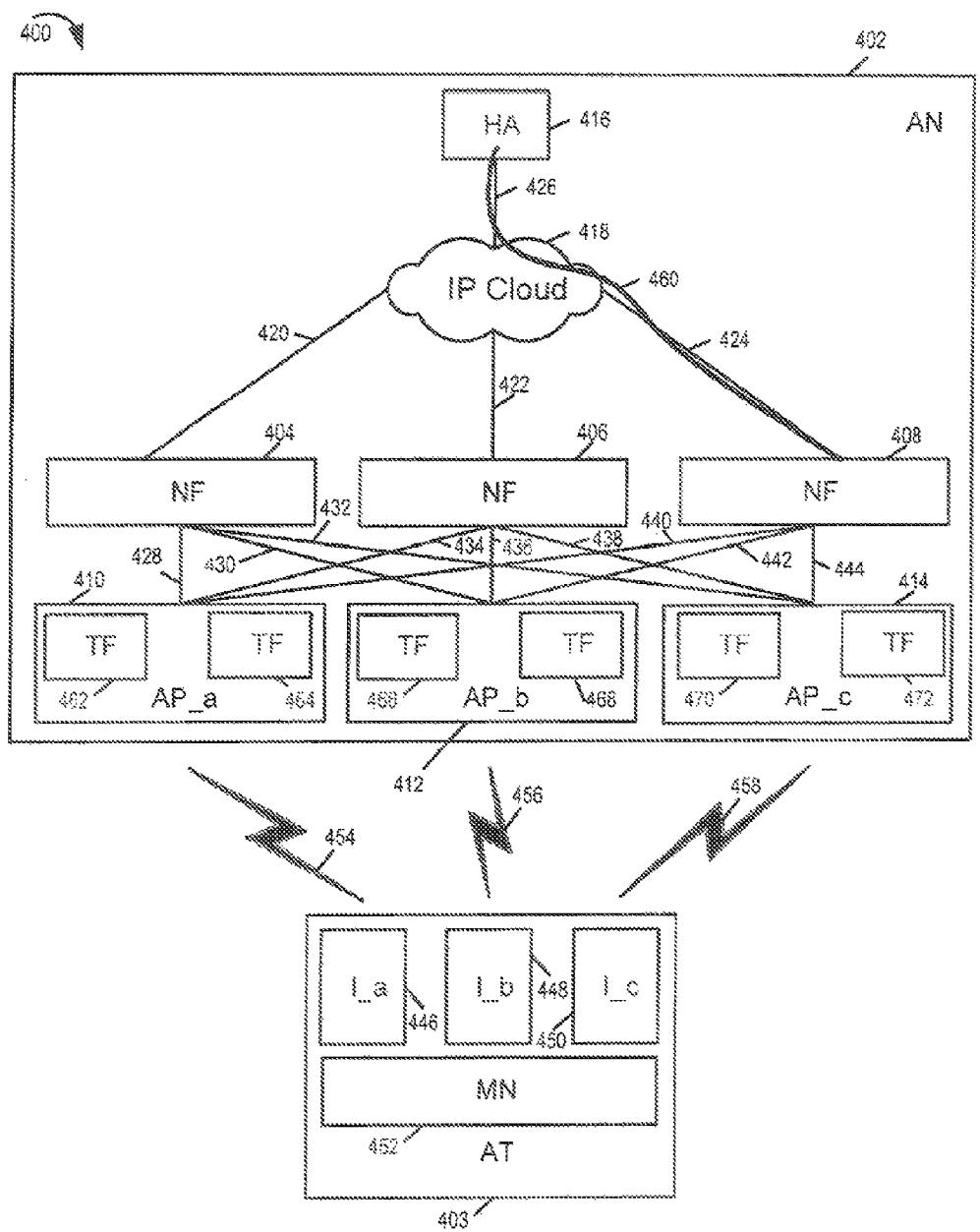

FIG. 3 illustrates an exemplary network 300 including a distributed AN 302 and an AT 303.

In the distributed architecture shown in FIG. 3, the AN 302 comprises access points (AP) and home agents (HA). AN 302 includes a plurality of access points (APa 304, APb 306, APc 308) and home agent 310. In addition, AN 302 includes an IP cloud 312. The APs (304, 306, 308) are coupled to the IP cloud via links (314, 316, 318), respectively. The IP cloud 312 is coupled to the HA 310 via link 320.

An AP includes a:
Network function (NF):
One per AP, and multiple NFs can serve a single AT.
A single NF is the IP layer attachment point (IAP) for each AT, i.e., the NF to which the HA forwards packets sent to the AT. In the example of FIG. 4, NF 336 is the current IAP for AT 303, as shown by the line 322 in FIG. 4.
The IAP may change (L3 handoff) to optimize routing of packets over the backhaul to the AT.
The IAP also performs the function of the session master for the AT. (In some embodiments, only the session master can perform session configuration, or change the session state.)
The NF acts as the controller for each of the TFs in the AP and performs functions like allocating, managing and tearing down resources for an AT at the TF.
Transceiver functions (TF) or sector:
Multiple per AP, and multiple TFs can serve a single AT.
Provides the air interface attachment for the AT.
Can be different for the forward and reverse links.
Changes (L2 handoff) based on radio conditions.
In AN 302 APa 304 includes NF 324, TF 326 and TF 328. In AN 302 APb 306 includes NF 330, TF 332 and TF 334. In AN 302 APc 308 includes NF 336, TF 338 and TF 340.

An AT includes a:
Interface I_x presented to the mobile node (MN) for each NF in the active set.
Mobile node (MN) to support IP layer mobility at the access terminal.
APs communicate using a tunneling protocol defined over IP. The tunnel is an IP-in-IP tunnel for the data plane and an L2TP tunnel for the control plane.
Exemplary AT 303 includes a plurality of Interfaces (I_a 342, I_b 344, I_c 346) and MN 348. AT 303 can be, and sometimes is, coupled to AP_a 304 via wireless link 350. AT 303 can be, and sometimes is, coupled to AP_b 306 via wireless link 352. AT 303 can be, and sometimes is, coupled to AP_c 308 via wireless link 354.

FIG. 4 illustrates an exemplary network 400 including a distributed AN 402 and an AT 403.

In a centralized architecture shown in FIG. 4, the NF is no longer logically associated with a single TF, so the AN comprises network functions, access points and home agents. Exemplary AN 402 includes a plurality of NFs (404, 406, 408), a plurality of APs (AP_a 410, AP_b 412, AP_c 414), HA 416 and IP cloud 418. NF 404 is coupled to IP cloud 418 via link 420. NF 406 is coupled to IP cloud 418 via link 422. NF 408 is coupled to IP cloud 418 via link 424. IP cloud 418 is coupled to HA 416 via link 426. NF 404 is coupled to (AP_a 410, AP_b 412, AP_c 414) via links (428, 430, 432), respectively. NF 406 is coupled to (AP_a 410, AP_b 412, AP_c 414) via links (434, 436, 438), respectively. NF 408 is coupled to (AP_a 410, AP_b 412, AP_c 414) via links (440, 442, 444), respectively.

AP_a 410 includes TF 462 and TF 464. AP_b 412 includes TF 466 and TF 468. AP_c 414 includes TF 470 and TF 472.

Since an NF acts as the controller for a TF, and many NFs can be logically associated with a single TF, the NF controller for an AT, i.e., the NF communicating with an AT as a part of the active set, performs the functions of allocating, managing and tearing down resources for the TF at that AT. Therefore, multiple NFs may control resources at a single TF, although these resources are managed independently. In the example of FIG. 4, NF 408 is acting as an IAP for AT 403, as shown by the line 460.

The rest of the logical functions performed are the same as for the distributed architecture.

Exemplary AT 403 includes a plurality of Interfaces (I_a 446, I_b 448, I_c 450) and MN 452. AT 403 can be, and sometimes is, coupled to AP_a 410 via wireless link 454. AT 403 can be, and sometimes is, coupled to AP_b 412 via wireless link 456. AT 403 can be, and sometimes is, coupled to AP_c 414 via wireless link 458.

In systems like DO and 802.20, an AT obtains service from an AP by making an access attempt on an access channel of a particular sector (TF). The NF associated with the TF receiving the access attempt contacts the IAP that is the session master for the AT and retrieves a copy of the AT's session. (The AT indicates the identity of the IAP by including an UATI in the access payload. The UATI may be used as an IP address to directly address the IAP, or may be used to look up the address of the IAP.) On a successful access attempt, the AT is assigned air interface resources such as a MAC ID and data channels to communicate with that sector.

Additionally, the AT may send a report indicating the other sectors it can hear and their signal strengths. The TF receives the report and forwards it to a network based controller in the NF which in turn provides the AT with an active set. For DO and 802.20 as they are implemented today, there is exactly one NF that the AT can communicate with (except during an NF handoff when there are temporarily two). Each of the TFs in communication with the AT will forward the received data and signaling to this single NF. This NF also acts as a network-based controller for the AT and is responsible for negotiating and managing the allocation and tear down of resources for the AT to use with the sectors in the active set.

The active set is therefore the set of sectors in which the AT is assigned air interface resources. The AT will continue to send periodic reports and the network based controller may add or remove sectors from the active set as the AT moves around in the network.

NFs in the active set will also fetch a local copy of the session for the AT when they join the active set. The session is needed to communicate properly with the AT.

For a CDMA air link with soft handoff, on the uplink each of the sectors in the active set may try to decode an AT's transmission. On the downlink, each of the sectors in the active set may transmit to the AT simultaneously, and the AT combines the received transmissions to decode the packet.

For an OFDMA system, or a system without soft handoff, a function of the active set is to allow the AT to switch quickly between sectors in the active set and maintain service without having to make a new access attempt. An access attempt is generally much slower than a switch between members of the active set, since the active set member already has the session and the air interface resources assigned to the AT. Therefore, an active set is useful to do handoff without affecting the QoS service of active applications.

When, an AT and the session master in the IAP negotiate attributes, or alternatively the state of the connection changes, the new values for the attributes or the new state need to be distributed to each of the sectors in the active set in a timely manner to ensure optimal service from each sector. In some cases, for example if the type of headers changes, or security keys change, an AT may not be able to communicate at all with a sector until these changes are propagated to that sector. Thus every member of the active set should be updated when the session changes. Some changes may be less critical to synchronize than others.

There are three main types of state or context found in the network for an AT that has an active connection:

Data state is the state in the network on the data path between the AT and the IAP or an NF during a connection. Data state includes things such as header compressor state or RLP flow states which are very dynamic and difficult to transfer.

Session state is the state in the network on the control path between the AT and the IAP that is preserved when a connection is closed. Session state includes the value of the attributes that are negotiated between the AT and the IAP. These attributes affect the characteristics of the connection and the service received by the AT. For example, an AT may negotiate the QoS configuration for a new application and supply new filter and flow specifications to the network indicating the QoS service requirements for the application. As another example the AT may negotiate the size and type of the headers used in communication with the AN. The negotiation of a new set of attributes is defined as a session change.

Connection state is the state in the network on the control path between the AT and the IAP or an NF that is not preserved when a connection closes and the AT is idle. Connection state may include such information as power control loop values, soft handoff timing, and active set information.

In an IAP or L3 handoff the three types of state may need to be transferred between the old IAP and the new IAP. If only an idle AT can make an L3 handoff, then only the session state needs to be transferred. To support L3 handoff for an active AT, the data and connection state may also need to be transferred.

Systems like DO and 802.20, make L3 handoff of the data state simple by defining multiple routes (or data stacks), where the data state for each route is local to that route, i.e., the routes each have independent data state. By associating each IAP with a different route, the data state does not need to be transferred in a handoff. A further, even better step, is to associate each NF with a different route in which case L3 handoff is completely transparent to the data state, except for possible packet reordering.

Since the data state has multiple routes, the next logical step to support L3 handoff for an active AT is to move the control of the connection state from the IAP and make it local to each NF in the active set. This is done by defining multiple control routes (or control stacks) and defining the air interface so that the control stacks are independent and local to each NF. This may require that some of the negotiating and managing the allocation and tear down of resources of the connection state is transferred to the AT since there is no longer a single NF to manage all the members of the active set. It may also make some additional requirements on the air interface design to avoid a tight coupling between TFs—since different TFs may not share the same NF—in the active set. For instance, to operate in an optimal way, it is preferable to eliminate all tight synchronization between TFs that do not have the same NF, such as power control loops, soft handoff, etc.

Pushing the data and connection state down to the NFs eliminates the need to transfer this state on a L3 handoff, and also should make the NF-to-NF interface simpler.

The system therefore defines multiple independent data and control stacks (called interfaces in FIG. 3 and FIG. 4), in the AT to communicate with different NFs as needed, as well as the addressing mechanisms for the AT and TFs to logically distinguish between these stacks.

Fundamentally, some session state (QoS profile, security keys, attribute values, etc.) cannot be made local to an NF (or IAP) because it is too expensive to negotiate every time there is a NF (or a L3) handoff. Also the session state is relatively static and easy to transfer. What is needed are mechanisms to manage and update the session state as it changes and during IAP handoff where the session master moves.

Optimizing the session state transfer for L3 handoff is a useful feature for every system regardless of the network architecture since it simplifies network interfaces and should also improve the seamlessness of handoff.

A separate but related issue is the AT control of L3 handoff. Today, in systems like DO and 802.20, the AT is aware of the L3 handoff since it allocates and tears down local stacks, but it has no control of when L3 handoff occurs. This is called network-based mobility management. The question is whether to make AT the handoff controller, i.e., to use AT based mobility management?

To support fault tolerance and load balancing, the network needs either to be able to make the handoff or have a mechanism to signal to the AT to do a handoff. Thus if AT based mobility management is used, the network still needs a mechanism to indicate when it should occur.

AT based mobility management has some obvious advantages, such as allowing for a single mechanism for inter and intra technology, or global and local mobility. It also simplifies the network interfaces further by not requiring the network elements to determine when to do handoff.

The primary reason systems like DO and 802.20 use network based mobility is that AT based mobility is not optimized to work fast enough to support voice. A secondary reason is the tunneling overhead introduced by terminating the mobile IP tunnels (for MIPv6) in the AT. The mobility latency can be solved by forwarding data using tunnels between the current and previous forward link serving sector, as well as possibly using bicasting, where the data is sent to multiple NFs in the active set simultaneously.

In SimpleRAN, there are two types of handoff:

Layer 2 or L2 handoff refers to changing of the forward link or reverse link serving sector (TF).

L3 handoff refers to changing of the IAP,

L2 handoff should be as fast as possible in response to changing radio conditions. Systems like DO and 802.20 use PHY layer signaling to make L2 handoff fast.

L2 handoff is transfer of the serving sector TF for the forward (FL) or reverse (RL) links. A handoff occurs when the AT selects a new serving sector in the active set based on the RF conditions seen at the AT for that sector. The AT performs filtered measurements on the RF conditions for the forward and reverse links for all sectors in the active set. For instance, in 802.20 for the forward link the AT can measure the SINR on the acquisition pilots, the common pilot channel (if present), and the pilots on the shared signaling channel, to select its desired FL serving sector. For the reverse link, the AT estimates the CQI erasure rate for each sector in the active set based on the up/down power control commands to the AT from the sector.

L2 handoff is initiated when the AT requests a different FL or RL serving sector via a reverse link control channel. Dedicated resources are assigned at a TF when it is included in the active set for an AT. The TF is already configured to support the AT before the handoff request. The target serving sector detects the handoff request and completes the handoff with the assignment of traffic resources to the AT. The forward link TF handoff requires a round trip of messaging between the source TF or IAP and target TF in order to receive data for the target TF to transmit. For reverse link TF handoff, the target TF may immediately assign resources to the AT.

L3 handoff is the transfer of the IAP. L3 handoff involves a HA binding update with the new IAP and requires a session transfer to the new IAP for the control-plane. L3 handoff is asynchronous to L2 handoff in the system so that L2 handoff is not limited by MIPv6 handoff signaling speed.

L3 handoff is supported over the air in the system by defining an independent route to each NF. Each flow provides multiple routes for transmission and reception of higher layer packets. The route indicates which NF processed the packet. For example, one NF may be associated at the TF and over the air as Route A, while another NF may be associated with Route B. A serving TF can simultaneously send packets to an AT from both Route A and Route B. i.e., from both NFs, using a separate and independent sequence space for each.

There are two key ideas in the system design to ensure the QoS treatment for a mobile and its traffic is retained over each handoff mode:

Decoupling of L2 and L3 Handoff

Reserving air interface resources and fetching the session at the target NF or TF before the handoff occurs to minimize the data flow interruption during the handoff. This is done by adding the target TF and NF to the active set.

The system is designed to separate L2 and L3 handoff in order to allow the system to support EF traffic during high rates of L2 handoff. L3 handoff requires a binding update, which is limited to a rate of 2 to 3 per second. In order to allow a faster L2 handoff rate of 20 to 30 Hz, L2 and L3 handoff are designed to be independent and asynchronous.

For L2 handoff, the active set management allows all the TFs in the active set to be configured and dedicated resources assigned in order to be ready to serve the AT in the event of an L2 handoff.

Consider a Mobile Wireless Communication System with multiple access points (AP) that provide service to access terminals (AT). Many systems have an active set, which is a set of APs that have assigned resources to the AT. At a given point in time, an AT may be within range of radio communication with one of the APs, or for the purpose of battery power optimization and radio interference reduction, may communicate only with one carefully selected AP (serving AP). The problem considered here is the delivery of messages and data between the various APs in the system, such that the serving AP can deliver messages to and from the AT.

APs can exchange data over an L2TP (layer two tunneling protocol) tunnel. If AP1 has to send a message or data to the AT, while AP2 is the serving AP, then AP1 first uses the L2TP tunnel to deliver the packet to AP2, and AP2 delivers this packet to the AT using a mechanism including the use of an identifier bit, e.g., a reprocess bit.

Similarly, if the AT has to send a message or data to AP1, while AP2 is serving, it sends the message to AP2 with a remote bit set, and AP2 sends this packet to AP1 via the L2TP tunnel.

The L2TP header includes the following fields
1. UserID: This is the address of the user to which the L2TP packet is addressed
2. ForwardOrReverse: This field identifies if the AT is the destination or the source of the packet.
3. FlowID: In one design, this field may be present only in forward link packets (packets destined to the AT), and it identifies the flow that the serving AP should use to deliver the packet to the AT
4. SecurityField: In one design, this field may be present only in reverse link packets (packets originated at the AT). The SecurityField may include an IsSecure bit, a KeyIndex field (to identify the keys used for security operation) and a CryptoSync field.

In an aspect, forward Link L2TP Packets are communicated. Here we describe the process used by an AP to send and receive a forward link L2TP packet. An AP sends a forward link L2TP packet when it has data or a message to send to the AT. The AP forms the appropriate header and sends the L2TP packet to the serving AP (or if it does not know the identity of the serving AP, possibly by routing the packet through a central node—the IAP).

When an AP receives a forward link L2TP packet, it does the following steps
1. If the AP is not serving for the given UserID (in the L2TP header), it forwards the packet to the current serving AP (possibly by routing the packet through a central node—the IAP)
2. If the AP is serving for the given UserID, it delivers the packet to the AT using the RLP flow and associated QoS attributes for the given FlowID (in the L2TP header).

In an aspect, reverse Link L2TP Packets are communicated. Here we describe the process used by an AP to send and receive a reverse link L2TP packet.

An AP sends a reverse link L2TP packet when it receives a packet from the AT, and the remote bit is set for that packet. The first step for the AP sending the L2TP packet is address determination.

Address Determination: If the remote bit for the packet is set, the packet also includes an address field to identify which AP this packet should be delivered to (target AP). The receiving AP maps the address field to the IP address of the AP. This mapping may be established by
1. An AT assisted method wherein messages describing a mapping are sent from the AT to the AP, and the mapping information is then used by the AP to map between the address used over the airlink and the IP address.
2. A network assisted method whereby mapping information provided by a central entity or by the target AP is used.
3. A PilotPN based method. In this case the address field may simply be equal to the PilotPN (or some upper bits of the PilotPN) of the AP corresponding to the address. The receiving AP knows the PilotPN and IP addresses of all neighboring APs as part of the network configuration (which itself may be network assisted) and uses this information to map between the PN based address and corresponding IP address.
4. An IAP address method, based on use of a reserved address, where a special address type is used by the AT to identify the AP which is the Internet attachment point for the AT. Each AP in an active set of APs corresponding to an AT knows the IP address of the IAP for the particular AT and can map between the IAP address and IP address of the AT's IAP.

After address determination, the AP sending the L2TP packet may also insert security related fields if needed, and as determined by the security design.

When an AP receives a reverse link L2TP packet, it does the following steps

1. If the AP is not serving the given UserID indicated in a received packet (in the L2TP tunnel), it ignores the packet
2. If the AP is serving the given UserID of the received packet, it processes the packet as if the packet were received from its own MAC (Media Access Control) layer. The processing of the packet may depend on the SecurityField received in the L2TP tunnel.

Consider a Mobile Wireless Communication System with multiple access points (AP) that provide service to access terminals (AT). Many systems have an active set, which is a set of APs that have assigned resources to the AT. At a given point in time, an AT may be within range of radio communication with one of the APs, or for the purpose of battery power optimization and radio interference reduction, the AT may communicate only with one carefully selected AP (serving AP). A problem considered here is the delivery of messages and data between the AT and various APs in the system.

Exemplary processing at the AP will be described. On the forward link, any source AP may deliver packets to the serving AP, which may then deliver the message to the AT. The serving AP inserts the address of the source AP in the packet header, and this causes the AT to know that the identity of the source AP. On the reverse link, the AT may insert the address of any destination AP in the packet header, and send the packet to the serving AP. The serving AP then forwards the packet to the destination AP.

For communications over an airlink, it is desirable to use a relatively short address. Some exemplary over the air addressing formats will now be described. The address may take one of several forms depending on the information available at the AT and/or AP between which a packet including the address is to be sent.

Devices may be Identified Using Different Types of Address

ActiveSetMembers: An active set member may be identified by an address that is determined during the active set add process.

SessionController: The session controller is known to the serving AP at all times, and may be identified by a reserved address.

Other: Other APs may require addressing during the Active Set add process (e.g., for the 'active set add request' and 'active set add response' messages). These APs may be identified by a Pilot based address, e.g., the full PilotPN of a sector in the AP, or by some upper bits of the PilotPN. Note that the 'active set add response' message may contain an address that is used to identify the active set member AP for future addressing, this may be a network provided or AT provided airlink address.

Figure 5:
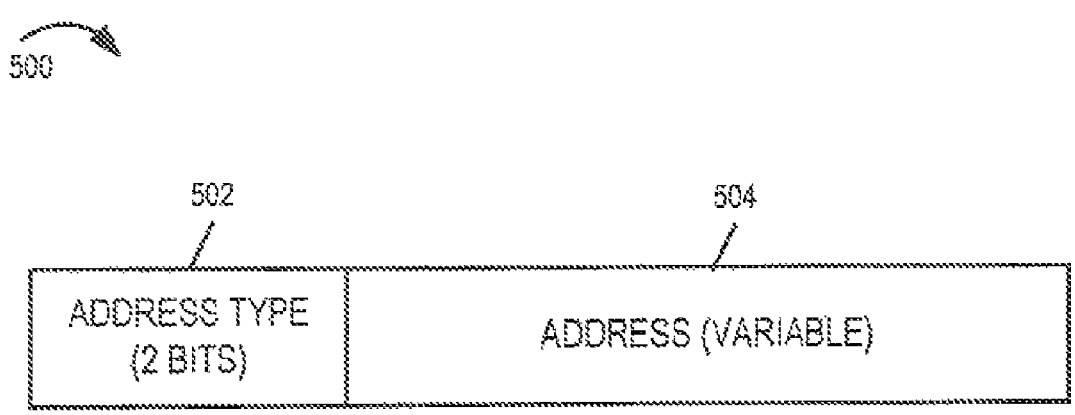
FIG. 5 is a drawing of an exemplary format for an airlink address in accordance with various embodiments.

In one exemplary embodiment, the address itself comprises two fields, and AddressType (e.g., 2 bits) followed by a variable length Address. The AddressType field may be used for various types such as: i) a pilot code based address type; ii) a network assisted address type; iii) an access terminal assisted address type; and iv) a reserved address type. FIG. 5 is a drawing of an exemplary address format 500 including a two bit address type field 502 and a variable length address field 504. The variable length field may include 0 (in the case of a null value being communicated) to a maximum, e.g., predetermined number of bits.

Various Embodiments Support Broadcast Messages.

Consider the case when several ATs have AP1 and AP2 in the active set. Further, let a large number of these ATs have AP2 as their serving AP. In case AP1 wishes to send a message to all of these ATs, an optimization is supported where the message is sent only once over the air, and only once over the backhaul.

In some embodiments when AP1 sends the message to AP2 over the L2TP tunnel, it may set the destination to a broadcast address. On seeing this destination address setting, AP2 may send the message on a broadcast channel.

Various advantages of features included in some embodiments are:

AT may exchange signaling messages with non-serving APs (an L2TP tunnel may be used between the APs)

AT may exchange data (or partial data packets) with non-serving APs (an L2TP tunnel may be used between the APs)

On the forward link, the serving AP is not required to parse the address (this address may be the same address that was received by the serving AP over the L2TP tunnel)

The address for the SessionController may be compressed to just two bits (AddressType='11' followed by an empty address field). The entire IP (Internet Protocol) address of the session controller need not be carried over the air. This is because the serving AP always knows the identity of the SessionController.

Figure 6B:
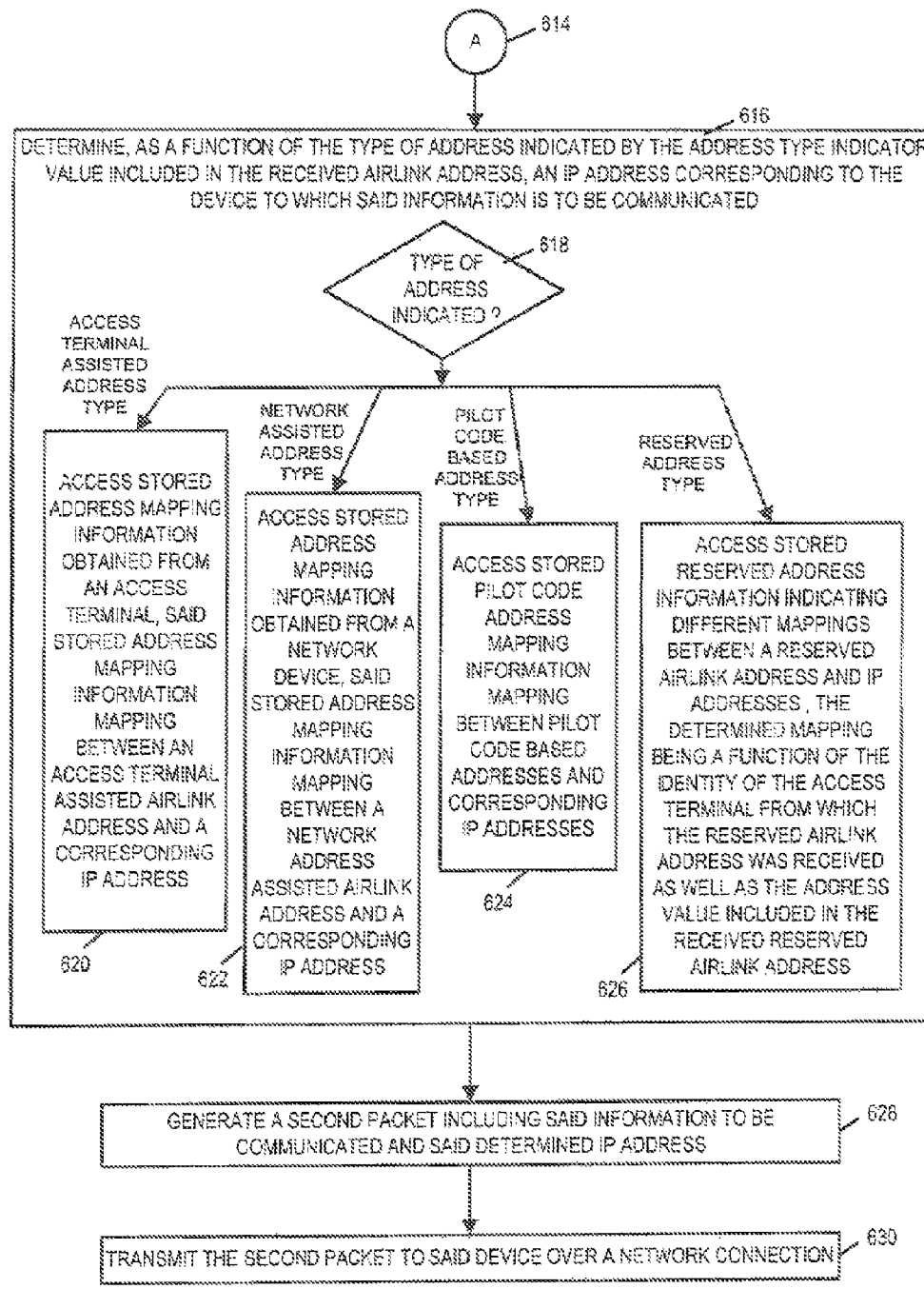
FIG. 6 is a flowchart of an exemplary method of operating an access point in accordance with various embodiments.

FIG. 6 comprising the combination of FIG. 6A and FIG. 6B is a flowchart 600 of an exemplary method of operating an access point in accordance with various embodiments. Operation starts in step 602, where the access point is powered on and initialized and proceeds to step 604, where the access terminal receives address mapping information from an access terminal. Operation proceeds from step 604 to step 606. In step 606, the access terminal receives address mapping information from a network device, said address mapping information providing address mapping information indicating an address mapping between a network assisted address value corresponding to another network device and an IP address corresponding to said another network device, said another network device being a device other than an access terminal. Operation proceeds from step 606 to step 608, in which the access point receives pilot code information indicating pilot codes used by at least some access points and IP addresses corresponding to said access points. Operation proceeds from step 608 to step 610. In step 610, the access point receives reserved address information indicating a reserved address and an IP address corresponding to the reserved address for the access terminal. Operation proceeds from step 610 to step 612.

Steps 604, 606, 608 and 610 are optional steps. In some embodiments, one or more of steps 604, 606, 608, and 610 are performed, while others are omitted. If an optional step is omitted then, operation bypasses the step. The sequence of optional steps 604, 606, 608 and 610 may be and sometimes is different. In some embodiments, one or more of optional steps 604, 606, 608, and 610 are performed in parallel.

In step 612, the access point receives from an airlink, a first packet communicated from an access terminal, the first packet including information to be communicated and an airlink address indicating the device to which said information is directed, said airlink address including an address type indicator field including an address type indicator value which indicates one of a plurality of supported address types to which said address corresponds.

In some embodiments, the address type indicator value is a mult-bit value used to indicate one of a plurality of different address types. In various embodiments, the plurality of different address types includes at least four different address types. Four exemplary different address types include an access terminal assisted address type, a network assisted address type, a Pilot code based address type, and a reserved address type. Operation proceeds from step 612 via connecting node A 614 to step 616.

In step 616, the access terminal determines, as a function of the type of address indicated by the address type indicator value included in the received airlink address, an IP address corresponding to the device to which said information is to be communicated. Step 616 includes sub-steps 618, 620, 622, 624 and 626. Sub-step 618 directs flow to different sub-steps depending upon the type of address indicated by the address type indicator value included in the received airlink address. If the type of address indicated is an access terminal assisted address type, then operation proceeds from sub-step 618 to sub-step 620, in which the access point accesses stored address mapping information obtained from an access terminal, said stored address mapping information mapping between an access terminal assisted airlink address and a corresponding IP address. If the type of address indicated is a network assisted address type, then operation proceeds from sub-step 618 to sub-step 622, in which the access point accesses stored address mapping information obtained from a network device, said stored address mapping information mapping between a network address assisted airlink address and a corresponding IP address. If the type of address indicated is a pilot code based address type, then operation proceeds from sub-step 618 to sub-step 624, in which the access point accesses stored pilot code address mapping information mapping between pilot code based addresses and corresponding IP addresses. If the type of address indicated is a reserved address type, then operation proceeds from sub-step 618 to sub-step 626, in which the access point accesses stored reserved address information indicating different mappings between a reserved airlink address and IP addresses, the determined mapping being a function of the identity of the access terminal from which the reserved airlink address was received as well as the address value included in the received reserved airlink address.

Operation proceeds from step 616 to step 628, in which the access point generates a second packet including said information to be communicated and said determined IP address. Operation proceeds from step 628 to step 630 in which the access point transmits the second packet to said device over a network connection.

Figure 7:
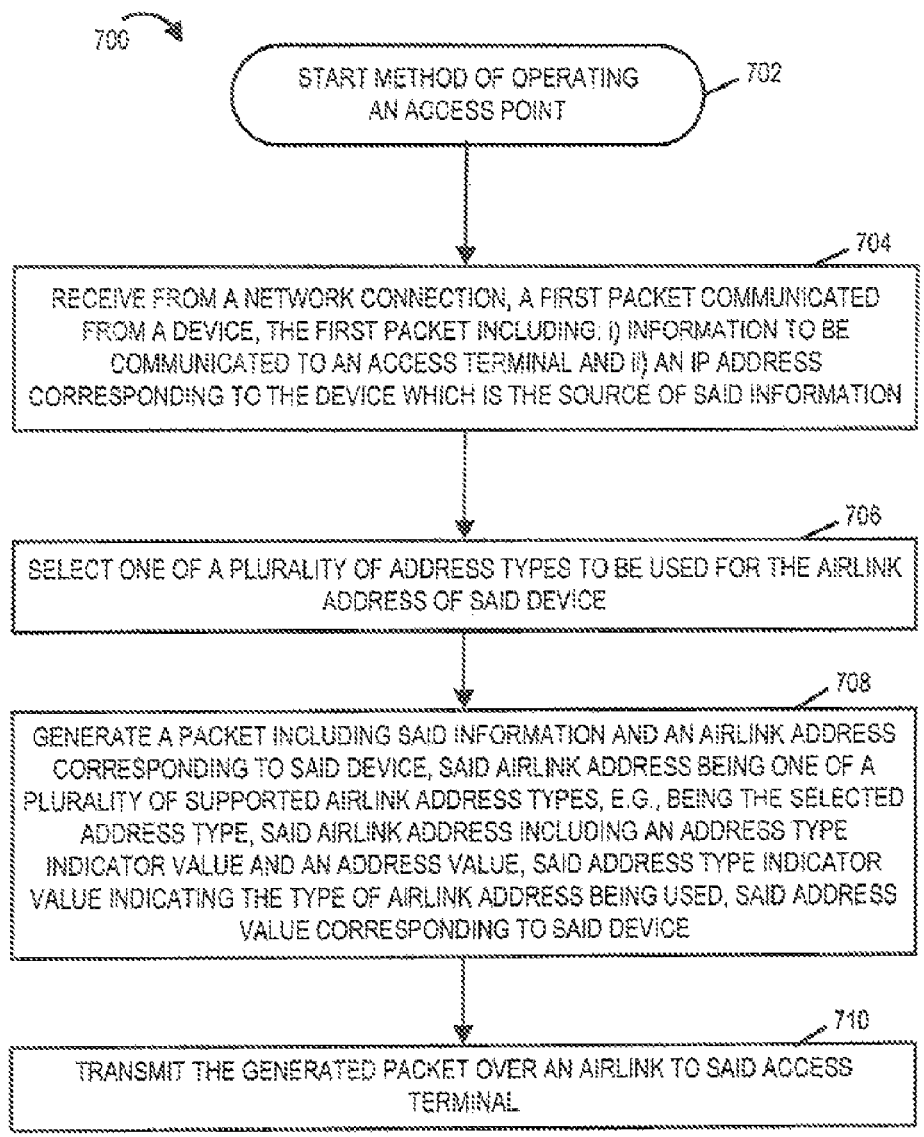
FIG. 7 is a flowchart of an exemplary method of operating an access point in accordance with various embodiments.

FIG. 7 is a flowchart 700 of an exemplary method of operating an access point in accordance with various embodiments. Operation starts in step 702, where the access point is powered on and initialized and proceeds to step 704. In step 704, the access point receives, from a network connection, a first packet communicated from a device, the first packet including: i) information to be communicated to an access terminal and ii) an IP address corresponding to the device which is the source of said information. Operation proceeds from step 704 to step 706. In step 706, the access point selects one of a plurality of address types to be used for the airlink address of said device. Operation proceeds from step 706 to step 708. In step 708, the access point generates a packet including said information and an airlink address corresponding to said device, said airlink address being one of a plurality of supported airlink address types, e.g., being the selected address type of step 706, said airlink address including an address type indicator value and an address value, said address type indicator value indicating the type of airlink address being used, said address value corresponding to said device.

In various embodiments, the address type indicator value is a multi-bit value. In some embodiments, the plurality of different address types includes at least four different address types. Four exemplary address types are: an access terminal assisted address type, a network assisted address type, a pilot code based address type, and a reserved address type. In some embodiments, the plurality of different address types includes at least two of: i) a pilot code address type; ii) a network assisted address type; iii) an access terminal assisted address type; and iv) a reserved address type.

In various embodiments, the pilot code address type is selected, when the said device is a remote access point and another airlink address corresponding to said device is not known to the access point. In some embodiments, a reserve address type is selected when said device is a device for which a reserved airlink address is known to the access point. Exemplary devices for which the access point may, and sometimes does, use a reserve address include a device serving as an AT's Internet Attachment Point and a device serving as an AT's Session Controller. In some embodiments, an access terminal assisted address type is selected when said device is a device for which an access terminal assisted airlink address provided by the access terminal to which said information is being communicated is known to said access point. In some embodiments, a network assisted address type is selected when said device is a device for which a network assisted airlink address provided by a network device is known to said access point and an access terminal assisted address is not known to said access point.

Operation proceeds from step 708 to step 710. In step 710 the access point transmits the generated packet over an airlink to the access terminal.

Figure 8:
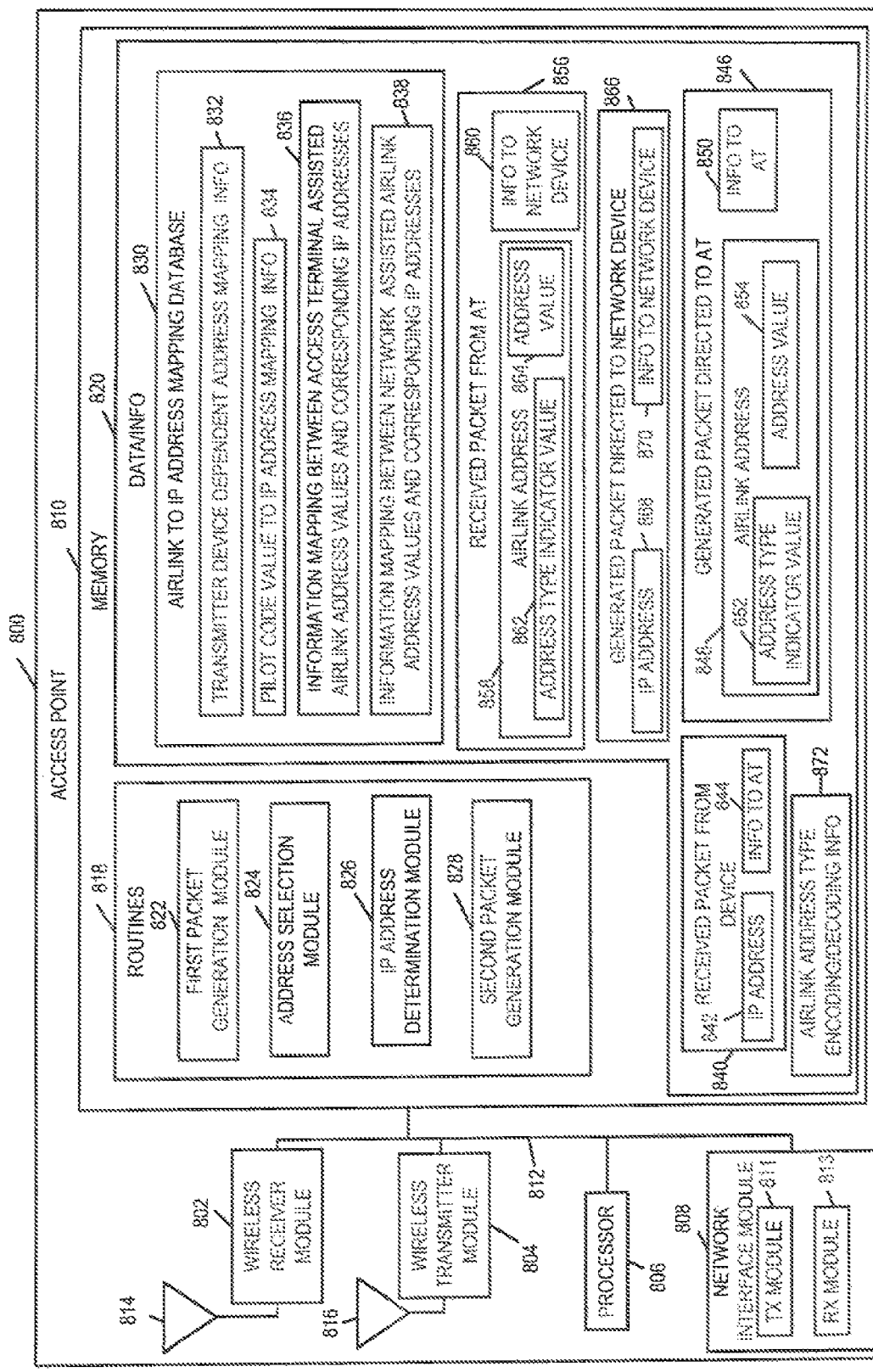
FIG. 8 is a drawing of an exemplary access point in accordance with various embodiments.

FIG. 8 is a drawing of an exemplary access point 800 in accordance with various embodiments. Exemplary access point 800 includes a wireless receiver module 802, a wireless transmitter module 804, a processor 806, a network interface module 808 and memory 810 coupled together via a bus 812 over which the various elements may interchange data and information. Memory 810 includes routines 818 and data/information 820. The processor 806, e.g., a CPU, executes the routines 818 and uses the data/information 820 in memory 810 to control the operation of the access point and implement methods, e.g., a method in accordance with flowchart 600 of FIG. 6 and/or flowchart 700 of FIG. 7.

Wireless receiver module 802, e.g., an OFDM and/or CDMA receiver, is coupled to receiver antenna 814 via which the access point receives uplink signals from access terminals. Wireless receiver module 802 receives from an airlink an airlink packet communicated from an access terminal, said airlink packet including information to be communicated and an airlink address indicating the device to which said information is directed. Received packet from AT 856 is an example of a received packet received by wireless receiver module 802.

Wireless transmitter module 804, e.g., an OFDM and/or CDMA transmitter, is coupled to transmit antenna 816 via which the access point transmits downlink signals to access terminals. Wireless transmitter module 804 transmits, over a wireless communications link, downlink packets directed to ATs. Wireless transmitter module 804 transmits a packet generated by first packet generation module 822 over an airlink. Exemplary generated packet directed to an AT 846 is a packet transmitted by wireless transmitter module 804.

In some embodiments multiple antennas and/or multiple antenna elements are used for reception. In some embodiments multiple antennas and/or multiple antenna elements are used for transmission. In some embodiments at least some of the same antennas or antenna elements are used for both transmission and reception. In some embodiments, the access point uses MIMO techniques.

Network interface module 808 couples the access point 800 to other network nodes, e.g., other access points, AAA nodes, home agent nodes, etc., and/or the Internet via network link 809. Network interface module 808 includes a transmitter module 811 and a receiver module 813. Transmitter module 811, e.g., a backhaul network transmitter, transmits a packet directed to a network device, said transmitted packet including a determined IP address and information to be communicated to the network device. For example, transmitter 811 transmits generated packet directed to network device 866, including information to network device 870. Receiver module 813, e.g., a backhaul network receiver, receives from a network connection, e.g. via network link 809, a packet communicated from a device, the packet including i) information to be communicated to an access terminal and ii) an IP address corresponding to the device which is the source of the information. Received packet from network device 840 is such an exemplary packet received via receiver module 813.

Routines 818 include a first packet generation module 822, an address selection module 824, an IP address determination module 826 and a second packet generation module 828. Data/information 820 includes an airlink to IP address mapping database 830, airlink address type encoding/decoding information 872, a received packet from device 840, a generate packet directed to an access terminal 846, a received packet from an access terminal 856 and a generated packet directed to a network device 866.

Airlink to IP address mapping database 830 includes transmitter device dependent address mapping information 832, pilot code value to IP address mapping information 834, information mapping between access terminal assisted airlink address values and corresponding IP addresses 836 and information mapping between network assisted airlink address values and corresponding IP addresses 838. In some embodiments, the transmitter device dependent address mapping information 832 is included for at least some reserved airlink addresses. In various embodiments pilot code value to IP address mapping information 834 is included for at least some pilot code based addresses, e.g., some PN pilot code based addresses.

Received packet from a network device 840 includes an IP address 842 and information to be communicated to the access terminal 844. Generated packet directed to an access terminal 846 includes an airlink address 848 and information to be communicated to the access terminal 850. The airlink address 848 includes an address type indicator value 852 and an address value 854. Received packet from an access terminal 856 includes an airlink address 858 and information to be communicated to a network device 860. The airlink address 858 includes an address type indicator value 862 and an address value 864.

First packet generation module 822 generates a packet including information and an airlink address corresponding to a device, said airlink address being one of a plurality of supported airlink address types, said airlink address including an address type indicator value and an address value, said address type indicator value indicating the type of airlink address being used, said address value corresponding to said device. Generated packet directed to an AT 846 is an exemplary packet generated by first packet generation module 822. Generated packet directed to AT 846, may be, and sometimes is generated to forward information received in received packet from device 840, and IP address 842 and address value 852 identify the same device which is the source of the information being conveyed to the access terminal.

Address selection module 824 selects, prior to first packet generating module 822 generating a packet, which one of the plurality of address types to be used for the airlink address. The address selection module 824 selects, in some embodiments, the pilot code address type when said device is a remote access point and another airlink address corresponding to said device is not known to said access point 800. For example, the pilot code address type may, and sometimes does, serve as a default address type. The address selection module 824 selects, in various embodiments, a reserve address type when said device is a device for which a reserved airlink address is known to said access point 800. Examples of device for which selection module 824 selects a reserved address type include a device serving as an AT's Internet Attachment Point and a device serving as an AT's Session Controller. In some embodiments, the address selection module 824 selects an access terminal assisted address type when said device is a device for which an access terminal assisted airlink address provided by the access terminal to which the information is being communicated is known to the access point 800. In some embodiments, the address selection module 824 selects a network assisted airlink address when said device is a device for which a network assisted airlink address provided by a network device is known to said access point 800 and an access terminal assisted airlink address is not known to the access point 800.

IP address determination module 826 determines, as a function of the type of address indicated by the address type indicator value included in a received airlink address, an IP address corresponding to the device to which the information included in the received airlink packet is to be communicated. For example, IP address determination module 826 determines IP address 868 as a function of the type of address indicated by the address type indicator value 862 in received packet from access terminal 856.

Second packet generation module 828 generates a packet directed to a network device, said generated packet including an IP address and information to be communicated to the network device, the IP address being the IP address determined by IP address determination module 826. Exemplary generated packet directed to network device 866 is a packet generated by second packet generation module 828, e.g., in response to received packet from AT 856.

In various embodiments, the address type indicator value is a multi-bit value. In some such embodiments, the plurality of different address types include at least four different address types. Four exemplary address types include: a pilot code address type, a network assisted address type, an access terminal assisted address type, and a reserved address type. Airlink address type encoding/decoding information 872 includes information identifying different address types with bit patterns for an address type indicator value field. In some embodiments, the plurality of different address types includes at least two of: i) a pilot code address type; ii) a network assisted address type; iii) an access terminal assisted address type; and iv) a reserved address type.

Figures 9, 9A:
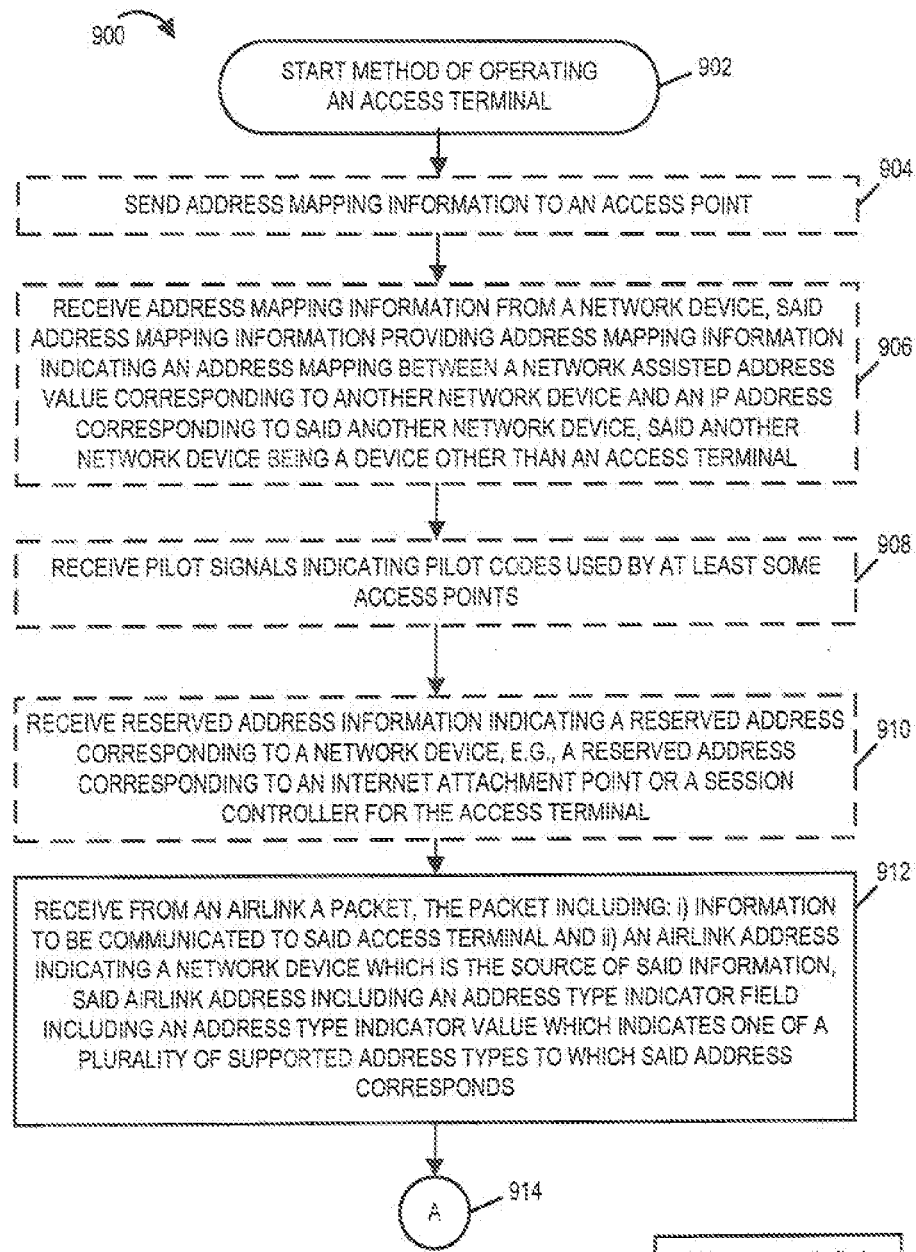
FIG. 9 is a flowchart of an exemplary method of operating an access terminal in accordance with various embodiments.
Figure 9B:
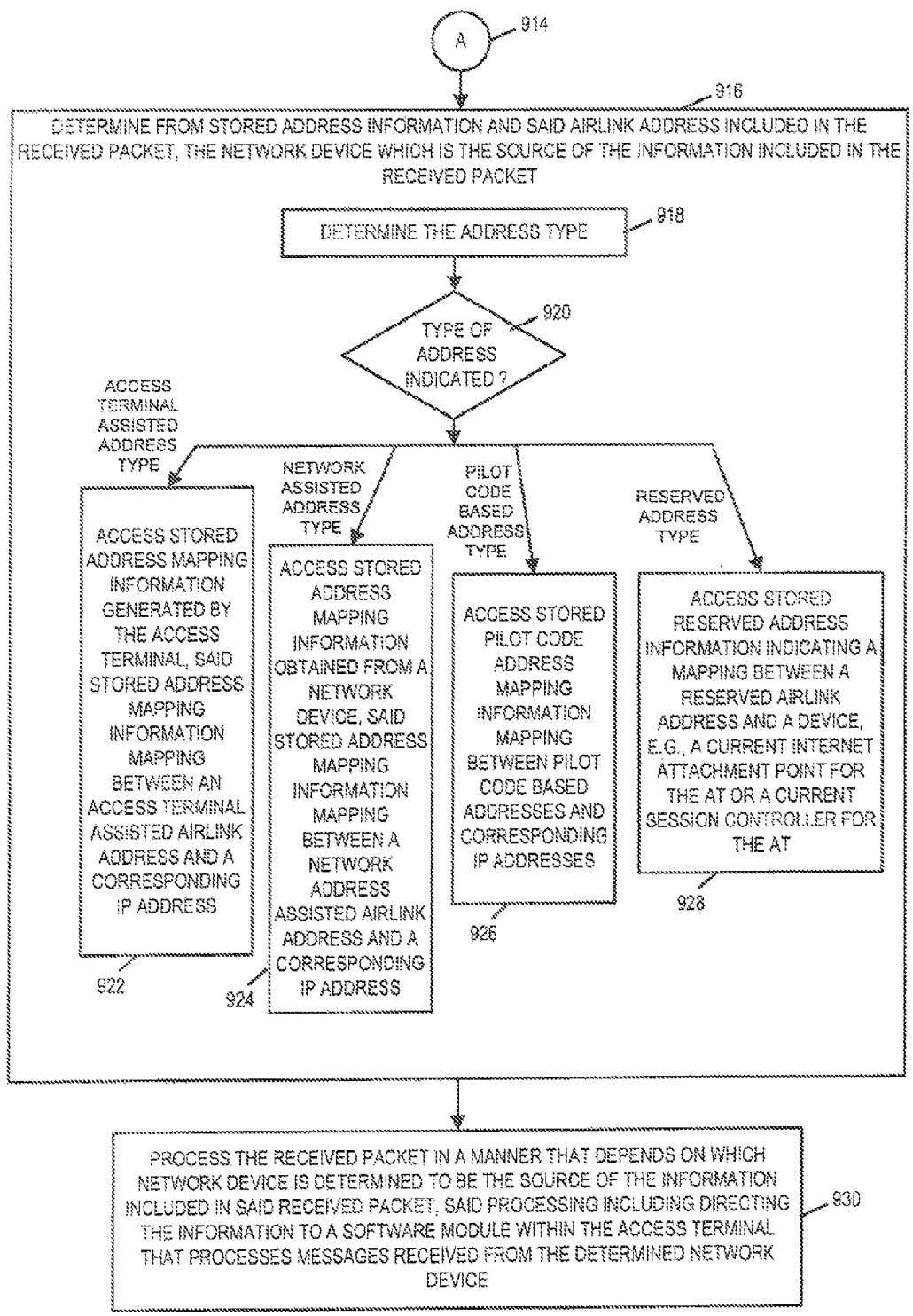

FIG. 9 comprising the combination of FIG. 9A and FIG. 9B is a flowchart 900 of an exemplary method of operating an access terminal in accordance with various embodiments. Operation starts in step 902, where the access terminal is powered on and initialized and proceeds to step 904. In step 904, the access terminal sends address mapping information to an access point. Operation proceeds from step 904 to step 906, in which the access terminal receives address mapping information from a network device, said address mapping information providing address mapping information indicating an address mapping between a network assisted address value corresponding to another network device and an IP address corresponding to said another network device, said another network device being a device other than an access terminal. Operation proceeds from step 906 to step 908. In step 908, the access terminal receives pilot signals indicating pilot codes used by at least some access points. Operation proceeds from step 908 to step 910. In step 910, the access terminal receives reserved address mapping information indicating a reserved address corresponding to a network device, e.g., a reserved address corresponding to an Internet Attachment Point or a Session Controller for the access terminal. In some embodiments, the access terminal receives a plurality of reserve addresses, e.g., a first reserve address for its Internet Attachment Point and a second address for its Session Controller. Operation proceeds from step 910 to step 912.

Steps 904, 906, 908 and 910 are optional steps. In some embodiments, one or more of steps 904, 906, 908, and 910 are performed, while others are omitted. If an optional step is omitted then, operation bypasses the step. The sequence of optional steps 904, 906, 908 and 910 may be and sometimes is different. In some embodiments, one or more of optional steps 904, 906, 908, and 910 are performed in parallel.

In step 912 the access terminal receives from an airlink a packet, the packet including: i) information to be communicated to said access terminal and ii) an airlink address indicating a network device which is the source of said information, said airlink address including an address type indicator field including an address type indicator value which indicates one of a plurality of supported address types to which said address corresponds.

The address type indicator value is, in some embodiments, a multi-bit value used to indicate one of a plurality of different address types. In some embodiments, the address type indicator value is followed by a variable length address value. In various embodiments, the plurality of different address types include at least four different address types. Four different exemplary address types are: an access terminal assisted address type, a network assisted address type, a pilot code based address type, and a reserved address type. Operation proceeds from step 912 via connecting node A 914 to step 916.

In step 916, the access terminal determines from stored address information and said airlink address included in the received packet, the network device which is the source of the information included in the received packet. Step 916 includes sub-steps 918, 920, 922, 924, 926 and 928. In sub-step 918, the access terminal determines the address type. Operation proceeds from sub-step 918 to sub-step 920. In sub-step 920 the access terminal directs flow to different sub-steps depending upon the type of address indicated by the address type indicator value included in the received airlink address. If the type of address indicated is an access terminal assisted address type, then operation proceeds from sub-step 920 to sub-step 922, in which the access terminal accesses stored address mapping information generated by the access terminal, said stored address mapping information mapping between an access terminal assisted airlink address and a corresponding IP address. If the type of address indicated is a network assisted address type, then operation proceeds from sub-step 920 to sub-step 924, in which the access terminal accesses stored address mapping information obtained from a network device, said stored address mapping information mapping between a network address assisted airlink address and a corresponding IP address. If the type of address indicated is a pilot code based address type, then operation proceeds from sub-step 920 to sub-step 926, in which the access terminal accesses stored pilot code address mapping information mapping between pilot code based addresses and corresponding IP addresses. If the type of address indicated is a reserved address type, then operation proceeds from sub-step 920 to sub-step 928, in which the access terminal accesses stored reserved address information indicating a mapping between a reserved airlink address and a device, e.g., a current Internet Attachment Point or a current Session Controller for the access terminal. In some embodiments, the stored reserved address information includes information indicating mapping for different devices, e.g., a mapping to a reserved address for the AT's IAP and a mapping to a different reserve address for the AT's Session Controller.

Operation proceeds from step 916 to step 930 in which the access terminal processes the received packet in a manner that depends on which network device is determined to be the source of the information included in said received packet, said processing including directing the information to a software module within the access terminal that processes messages received from the determined network device.

Figure 10:
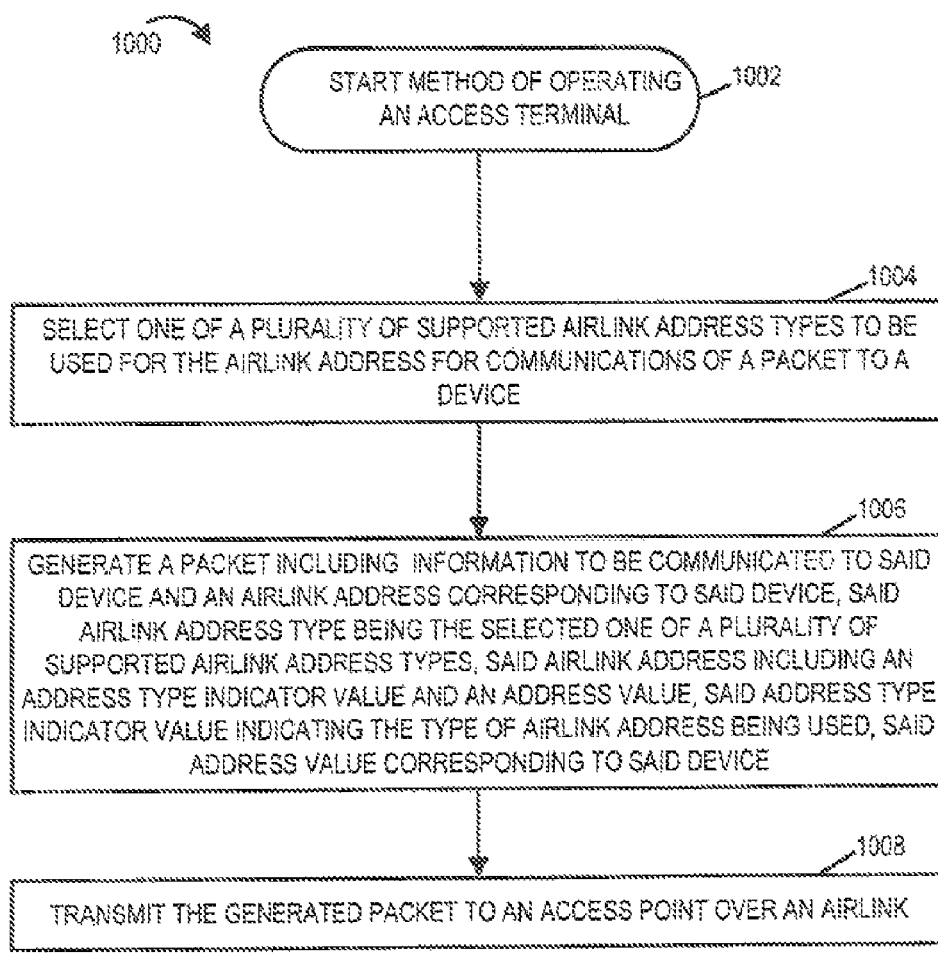
FIG. 10 is a flowchart of an exemplary method of operating an access terminal in accordance with various embodiments.

FIG. 10 is a flowchart 1000 of an exemplary method of operating an access terminal in accordance with various embodiments. Operation starts in step 1002, where the access terminal is powered on and initialized and proceeds to step 1004. In step 1004, the access terminal selects one of a plurality of supported airlink address types to be used for the airlink address for communications of a packet to a device. In various embodiments, the plurality of supported airlink address types includes at least four different address types, e.g., a pilot code address type, a network assisted address type, an access terminal assisted address type, and a reserved address type. In some embodiments, the plurality of supported address types includes at least two of: i) a pilot code address type; ii) a network assisted address type; iii) an access terminal assisted address type; and iv) a reserved address type.

In some embodiments, the access terminal selects a pilot code address type when the device is a remote access point and another airlink address corresponding to said device is not known to the access terminal. In some embodiments, the access terminal selects a reserved address type when the device is a device for which a reserved address is known to the access terminal, e.g., the device is the AT's IAP or Session Controller. In various embodiments, the access terminal selects an access terminal assisted address type when said device is a device for which an access terminal assisted airlink address is known to said access terminal and/or to said access point. In various embodiments, the access terminal selects a network assisted address type when the device is a device for which a network assisted airlink address is known to said access terminal and an access terminal assisted airlink address is not known to said access terminal. Operation proceeds from step 1004 to step 1006.

In step 1006, the access terminal generates a packet including information to be communicated to said device and an airlink address corresponding to said device, said airlink address type being the selected one of a plurality of supported airlink address types, said airlink address including an address type indicator value and address value, said address type indicator value indicating the type of airlink address being used, said address value corresponding to said device. In various embodiments, the address type indicator value is a multi-bit value. In some embodiments, the address value is a variable length value. In some such embodiments, the address value is a variable length value which can be a null value including no bits.

Operation proceeds from step 1006 to step 1008. In step 1008, the access terminal transmits the generated packet to an access point over an airlink.

Figure 11:
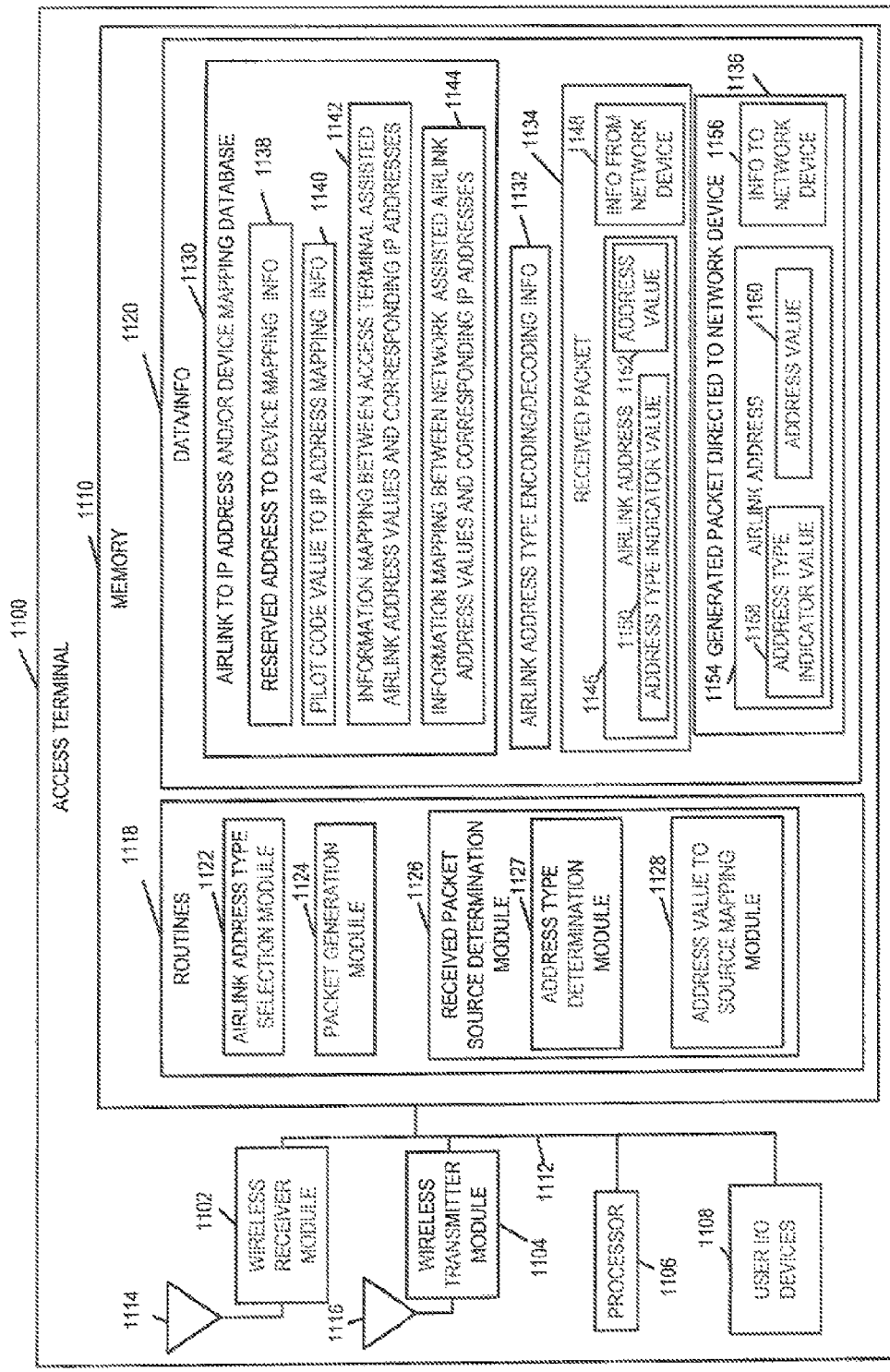
FIG. 11 is a drawing of an exemplary access terminal in accordance with various embodiments.

FIG. 11 is a drawing of an exemplary access terminal 1100 in accordance with various embodiments. Exemplary access terminal 1100 can, and sometimes does, communicate information to a remote device through an access point. Exemplary access terminal 1100 can, and sometimes does, receive information sourced from a remote device through an access point. Exemplary access terminal 1100 includes a wireless receiver module 1102, a wireless transmitter module 1104, a processor 1106, user I/O devices 1108 and memory 1110 coupled together via a bus 1112 over which the various elements may interchange data and information. Memory 1110 includes routines 1118 and data/information 1120. The processor 1106, e.g., a CPU, executes the routines 1118 and uses the data/information 1120 in memory 1110 to control the operation of the access terminal and implement methods, e.g., the methods of flowchart 900 of FIG. 9 and/or flowchart 1000 of FIG. 10.

Wireless receiver module 1102, e.g., a CDMA or OFDM receiver, is coupled to receive antenna 1114 via which the access terminal 1100 receives downlink signals from access points. Wireless receiver module 1102 receives packets, e.g., received packet 1134 from an access point, the received packet 1134 conveying information from a network device. Wireless receiver module 1102 receives from an airlink a communicated packet, the communicated packet including: i) information to be communicated to said access terminal and ii) an airlink address indicating a network device which is the source of said information, said airlink address including an address type indicator field including an address type indicator value which indicates one of a plurality of supported address types to which said address corresponds.

Wireless transmitter module 1104, e.g., a CDMA or OFDM transmitter, is coupled to transmit antenna 1116 via which the access terminal 1100 transmits uplink signals to access points. Wireless transmitter module 1104 transmits generated packets, e.g., generated packet directed to a network device 1136, over an airlink to an access point.

In some embodiments, the same antenna is used for transmission and reception. In some embodiments multiple antennas and/or multiple antenna elements are used for reception. In some embodiments multiple antennas and/or multiple antenna elements are used for transmission. In some embodiments at least some of the same antennas or antenna elements are used for both transmission and reception. In some embodiments, the access terminal uses MIMO techniques.

User I/O devices 1108 include, e.g., microphone, keyboard, keypad, switches, camera, speaker, display, etc. User I/O devices 1108 allow a user of access terminal 1100 to input data/information, access output data/information, and control at least some functions of the access terminal 1100, e.g., initiate a communications session with a peer node, e.g., another access terminal.

Routines 1118 include an airlink address type selection module 1122, a packet generation module 1124, and a received packet source determination module 1126. Received packet source determination module 1126 includes an address type determination module 1127 and an address value to source mapping module 1128.

Data/information 1120 includes an airlink to IP address and/or device mapping database 1130, airlink address type encoding/decoding information 1132, a received packet 1134, and a generated packet directed to a network device 1136. Airlink to IP address and/or device mapping database 1130 includes reserved address to device mapping information 1138, pilot code value to IP address mapping information 1140, information mapping between access terminal assisted airlink address values and corresponding IP addresses 1142 and information mapping between network assisted airlink address values and corresponding IP addresses 1144. Exemplary receive packet 1134 includes an airlink address 1146 and information from a network device 1148. The airlink address 1146 includes an address type indicator value 1150 and an address value 1152. The exemplary generated packet directed to a network device 1136 includes an airlink address 1154 and information to network device 1156. The airlink address 1154 includes an address type indicator value 1158 and an address value 1160.

Airlink type selection module 1122 selects a type of airlink address to be used to communicate information to a device, said address type being selected from a plurality of supported address types. In some embodiments, the plurality of different address types include at least four different address types, e.g., a pilot code address type, a network assisted address type, an access terminal assisted address type, and a reserved address type. In some embodiments, the plurality of different address types includes at least two of: a pilot code address type; a network assisted address type; an access terminal assisted address type; and a reserved address type.

In various embodiments, the selection module 1122 selects a pilot code address type when the device is a remote access point and another airlink address corresponding to said device is not known to said access terminal. The selection module 1122 selects, in some embodiments, a reserved address type when the device is a device for which a reserved airlink address is known to said access terminal, e.g., an Internet Attachment Point or a Session Controller. The selection module 1122 selects, in some embodiments, an access terminal assisted airlink address type when said device is a device for which an access terminal assisted airlink address is known to said access terminal and/or said access point. In some embodiments, the selection module 1122 selects a network assisted address type when the device is a device for which a network assisted airlink address provided by a network device is known to said access terminal and an access terminal assisted airlink address is not known to said access terminal.

Packet generation module 1124 generates a packet including: i) the information to be communicated; and ii) an airlink address corresponding to a device to which said information is to be communicated, said airlink address including an address type indicator value and an address value, said address type indicator value indicating the type of address being used, said address value corresponding to said device. Generated packet 1136 is a packet generated by packet generation module 1124.

The address type indicator value is, in some embodiments, a multi-bit value. In various embodiments, the address value is a variable length value. In some such embodiments, the address value is a variable length value which can be a null value including no bits.

Received packet source determination module 1126 determines from stored address information, e.g., mapping information 1130 and/or airlink address type encoding/decoding information 1132, and said airlink address included in a received packet, the network device which is the source of information included in the received packet. Address type determination module 1127 determines the type of airlink address included in the communicated packet from said address type indicator value. Address value to source mapping module 1128 determines at least one of: i) an IP address corresponding to the source of the information included in said packet; and ii) a device corresponding to the source of the information included in said packet, the determination being performed as a function of the determined address type and an address value included in the airlink address with said address type indicator value.

In various embodiments, nodes described herein are implemented using one or more modules to perform the steps corresponding to one or more methods of the aspect, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, the aspect is directed to a machine-readable medium including machine executable instructions for causing a machine, e.g., processor and associated hardware, to perform one or more of the steps of the above-described method(s).

In various embodiments nodes described herein are implemented using one or more modules to perform the steps corresponding to one or more methods, for example, signal processing, message generation and/or transmission steps. Some exemplary steps include transmitting a connection request, receiving a connection response, updating a set of information indicating an access point with which an access terminal has an active connection, forwarding a connection request, forwarding a connection response, determining resource assignment, requesting resources, updating resources, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as access terminals and/or access points, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating an access point, the method comprising:
    receiving from an airlink, a first packet communicated from an access terminal, the first packet including information to be communicated and an airlink address indicating the device to which said information is directed, said airlink address including an address type indicator field including an address type indicator value which indicates one of a plurality of supported address types to which said address corresponds, wherein the address type indicator value is followed by an address value having a variable length, wherein the plurality of supported address types includes at least a pilot code based address type, a network assisted address type, an access terminal assisted address type, and a reserved address type; and
    determining, as a function of the type of address indicated by the address type indicator value included in the received airlink address, an IP address corresponding to the device to which said information is to be communicated.

2. The method of claim 1, further comprising:
    generating a second packet including said information to be communicated and said determined IP address; and
    transmitting the second packet to said device over a network connection.

3. The method of claim 2, wherein a second one of said address types is a network assisted address type; and
    wherein determining an IP address corresponding to the device includes accessing stored address mapping information obtained from a network device, said stored address mapping information mapping between a network address assisted airlink address and a corresponding IP address.

4. The method of claim 3, further comprising:
    prior to receiving said first packet, receiving address mapping information from a network device, said address mapping information providing address mapping information indicating an address mapping between a network assisted address value corresponding to another network device and an IP address corresponding to said another network device, said another network device being a device other than an access terminal.

5. The method of claim 4, wherein a third one of said address types is a Pilot code based address type; and wherein determining an IP address corresponding to the device includes accessing stored pilot code address mapping information mapping between pilot code based addresses and corresponding IP addresses.

6. The method of claim 5, further comprising:
prior to receiving said first packet, receiving pilot code information indicating pilot codes used by at least some access points and IP addresses corresponding to said access points.

7. The method of claim 2, further comprising:
prior to receiving said first packet, receiving reserved address information indicating a reserved address and an IP address corresponding to the reserved address for said access terminal.

8. The method of claim 7, wherein determining an IP address corresponding to the device includes accessing stored reserved address mapping information indicating different mappings between a reserved airlink address and IP addresses, the determined mapping being a function of the identity of the access terminal from which the reserved address was received as well as the address value included in the received reserved airlink address.

9. The method of claim 1, wherein a first one of said address types is an access terminal assisted address type; and
wherein determining an IP address corresponding to the device includes accessing stored address mapping information obtained from an access terminal, said stored address mapping information mapping between an access terminal assisted airlink address and a corresponding IP address.

10. The method of claim 9, further comprising:
prior to receiving said first packet, receiving said address mapping information from an access terminal.

11. An apparatus comprising:
a processor configured to:
receive from an airlink, a first packet communicated from an access terminal, the first packet including information to be communicated and an airlink address indicating the device to which said information is directed, said airlink address including an address type indicator field including an address type indicator value which indicates one of a plurality of supported address types to which said address corresponds, wherein the address type indicator value is followed by an address value having a variable length, wherein the plurality of supported address types includes at least a pilot code based address type, a network assisted address type, an access terminal assisted address type, and a reserved address type; and
determine, as a function of the type of address indicated by the address type indicator value included in the received airlink address, an IP address corresponding to the device to which said information is to be communicated.

12. The apparatus of claim 11, wherein said processor is further configured to:
generate a second packet including said information to be communicated and said determined IP address; and
transmit the second packet to said device over a network connection.

13. The apparatus of claim 12, wherein a second one of said address types is a network assisted address type; and
wherein said access point processor is further configured to, in determining an IP address corresponding to the device, access stored address mapping information obtained from a network device, said stored address mapping information mapping between a network address assisted airlink address and a corresponding IP address.

14. The apparatus of claim 11, wherein a first one of said address types is an access terminal assisted address type; and
wherein said access point processor is further configured to, in determining an IP address corresponding to the device, access stored address mapping information obtained from an access terminal, said stored address mapping information mapping between an access terminal assisted airlink address and a corresponding IP address.

15. A non-transitory computer readable medium embodying machine executable instructions for controlling an access point to implement a method of communicating with other communications devices, the method comprising:
receiving from an airlink, a first packet communicated from an access terminal, the first packet including information to be communicated and an airlink address indicating the device to which said information is directed, said airlink address including an address type indicator field including an address type indicator value which indicates one of a plurality of supported address types to which said address corresponds, wherein the address type indicator value is followed by an address value having a variable length, wherein the plurality of supported address types includes at least a pilot code based address type, a network assisted address type, an access terminal assisted address type, and a reserved address type; and
determining, as a function of the type of address indicated by the address type indicator value included in the received airlink address, an IP address corresponding to the device to which said information is to be communicated.

16. The non-transitory computer readable medium of claim 15, further embodying machine executable instructions for:
generating a second packet including said information to be communicated and said determined IP address; and
transmitting the second packet to said device over a network connection.

17. The non-transitory, computer readable medium of claim 15, wherein a first one of said address types is an access terminal assisted address type; and
further embodying machine executable instructions for, in determining an IP address corresponding to the device, accessing stored address mapping information obtained from an access terminal, said stored address mapping information mapping between an access terminal assisted airlink address and a corresponding IP address.

18. The non-transitory computer readable medium of claim 15, wherein a second one of said address types is a network assisted address type; and
further embodying machine executable instructions for, in determining an IP address corresponding to the device, accessing stored address mapping information obtained from a network device, said stored address mapping information mapping between a network address assisted airlink address and a corresponding IP address.

19. An apparatus comprising:
means for receiving from an airlink, a first packet communicated from an access terminal, the first packet including information to be communicated and an airlink address indicating the device to which said information is directed, said airlink address including an address type indicator field including an address type indicator value which indicates one of a plurality of supported address types to which said address corresponds, wherein the address type indicator value is followed by an address value having a variable length, wherein the plurality of supported address types includes at least a pilot code based address type, a network assisted address type, an access terminal assisted address type, and a reserved address type; and means for determining, as a function of the type of address indicated by the address type indicator value included in the received airlink address, an IP address corresponding to the device to which said information is to be communicated.

* * * * *